(12) United States Patent
Fursund et al.

(10) Patent No.: US 12,148,093 B2
(45) Date of Patent: *Nov. 19, 2024

(54) OBJECT ILLUMINATION IN HYBRID RASTERIZATION AND RAY TRACED 3-D RENDERING

(71) Applicant: Imagination Technologies Limited, Kings Langley (GB)

(72) Inventors: Jens Fursund, Copenhagen (DK); Luke T. Peterson, San Francisco, CA (US)

(73) Assignee: Imagination Technologies Limited, Kings Langley (GB)

( * ) Notice: Subject to any disclaimer, the term of this patent is extended or adjusted under 35 U.S.C. 154(b) by 351 days.

This patent is subject to a terminal disclaimer.

(21) Appl. No.: 17/221,005

(22) Filed: Apr. 2, 2021

(65) Prior Publication Data

US 2021/0225068 A1 Jul. 22, 2021

Related U.S. Application Data

(63) Continuation of application No. 16/868,297, filed on May 6, 2020, now Pat. No. 10,991,153, which is a continuation of application No. 16/107,812, filed on Aug. 21, 2018, now Pat. No. 10,679,405, which is a continuation of application No. 14/644,830, filed on Mar. 11, 2015, now Pat. No. 10,083,541.

(60) Provisional application No. 61/952,371, filed on Mar. 13, 2014.

(51) Int. Cl.
*G06T 15/80* (2011.01)

(52) U.S. Cl.
CPC .................. *G06T 15/80* (2013.01)

(58) Field of Classification Search
CPC .................................................... G06T 15/80
See application file for complete search history.

(56) References Cited

U.S. PATENT DOCUMENTS

| | | | |
|---|---|---|---|
| 5,488,700 A | | 1/1996 | Glassner |
| 5,594,854 A | * | 1/1997 | Baldwin ................. G06T 15/00 345/506 |
| 6,025,853 A | * | 2/2000 | Baldwin ................. G09G 5/363 528/502 A |
| 6,111,582 A | | 8/2000 | Jenkins |

(Continued)

OTHER PUBLICATIONS

Aila et al., "Alias-Free Shadow Maps," Conference: Proceedings of the 15th Eurographics Workshop on Rendering Techniques, NorkOping, Sweden, Jun. 21-23, 2004.

Beister et al., "A Hybrid GPU-CPU Renderer," VMV 2005 Erlangen, Germany, Nov. 16-18, 2005.

(Continued)

*Primary Examiner* — Sarah Lhymn
(74) *Attorney, Agent, or Firm* — Potomac Law Group, PLLC; Vincent M DeLuca

(57) ABSTRACT

Rendering systems that can use combinations of rasterization rendering processes and ray tracing rendering processes are disclosed. In some implementations, these systems perform a rasterization pass to identify visible surfaces of pixels in an image. Some implementations may begin shading processes for visible surfaces, before the geometry is entirely processed, in which rays are emitted. Rays can be culled at various points during processing, based on determining whether the surface from which the ray was emitted is still visible. Rendering systems may implement rendering effects as disclosed.

20 Claims, 11 Drawing Sheets

(56) References Cited

U.S. PATENT DOCUMENTS

| | | | | |
|---|---|---|---|---|
| 6,313,846 | B1* | 11/2001 | Fenney | G06T 15/04 345/552 |
| 7,952,583 | B2* | 5/2011 | Waechter | G06T 15/06 345/426 |
| 9,013,498 | B1 | 4/2015 | Montrym et al. | |
| 2004/0125103 | A1* | 7/2004 | Kaufman | G06T 15/08 345/419 |
| 2007/0018980 | A1* | 1/2007 | Berteig | G06T 15/80 345/426 |
| 2007/0200848 | A1* | 8/2007 | Hu | G06T 15/50 345/426 |
| 2008/0211804 | A1 | 9/2008 | Hempel et al. | |
| 2009/0096789 | A1 | 4/2009 | Peterson et al. | |
| 2009/0322752 | A1 | 12/2009 | Peterson et al. | |
| 2010/0329358 | A1 | 12/2010 | Zhang et al. | |
| 2012/0001911 | A1 | 1/2012 | Gautron et al. | |
| 2013/0002671 | A1 | 1/2013 | Armsden et al. | |
| 2014/0125668 | A1 | 5/2014 | Steed et al. | |
| 2014/0267346 | A1 | 9/2014 | Ren et al. | |
| 2014/0327690 | A1 | 11/2014 | McGuire et al. | |
| 2016/0085551 | A1* | 3/2016 | Greathouse | G06F 9/3851 712/206 |

OTHER PUBLICATIONS

Iones et al., "Fast realistic lighting for video games," IEEE Computer Graphics and Applications (Impact Factor: 1.12) Jun. 2003; vol. 23, No. 3, pp. 54-64.

Purcell et al., "Ray Tracing on Programmable Graphics Hardware," ACM Trans. Graph. vol. 21, No. 3, pp. 703-712.

Sloan, "Stupid Spherical Harmonics (SH) Tricks", Feb. 2010, retrieved from www.ppsloan.org/publications.

Stamminger et al., "Interactive Walkthroughs and Higher Order Global Illumination," In Modeling, Virtual Worlds, Distributed Graphics, 1995, pp. 121-128.

Stamminger et al., "Perspective Shadow Maps," ACM Transactions on Graphics, 2002, pp. 557-562.

Stamminger et al., "Walkthroughs with Corrective Texturing," Tal Signal Processing, California Technical Publishing, 2002, pp. 377-388.

* cited by examiner

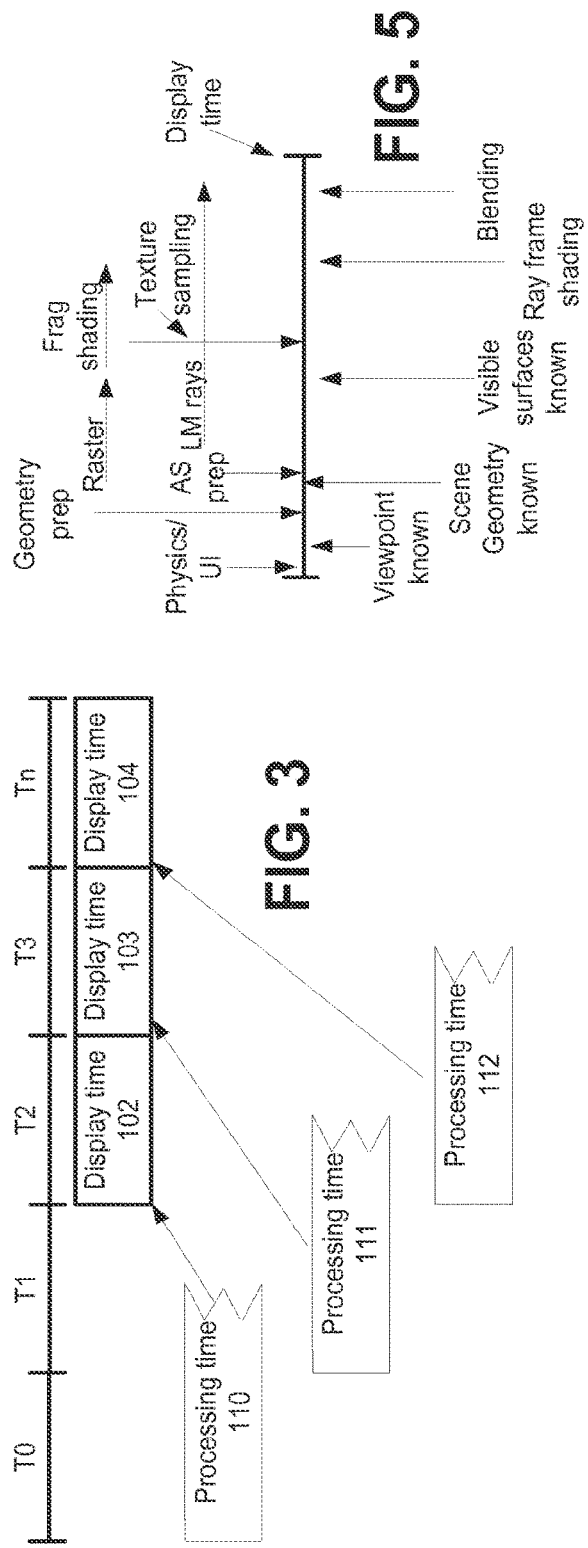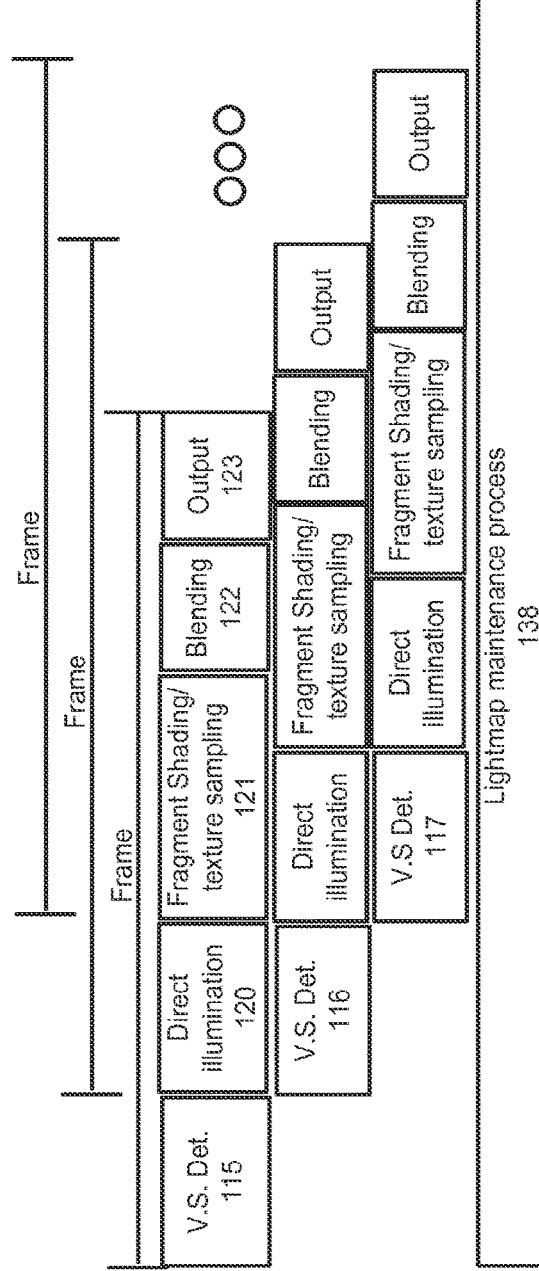

FIG. 8
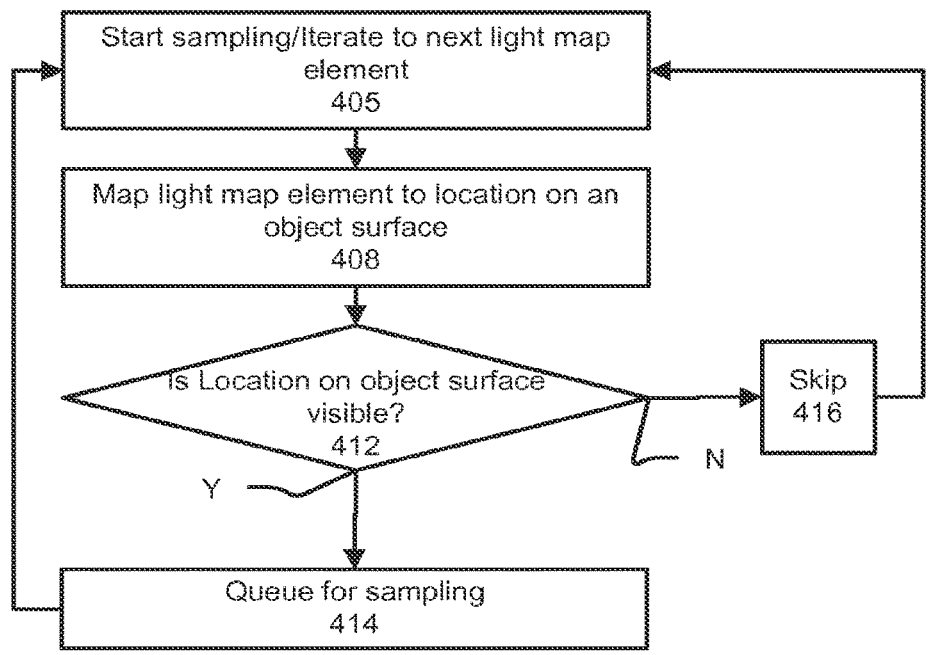
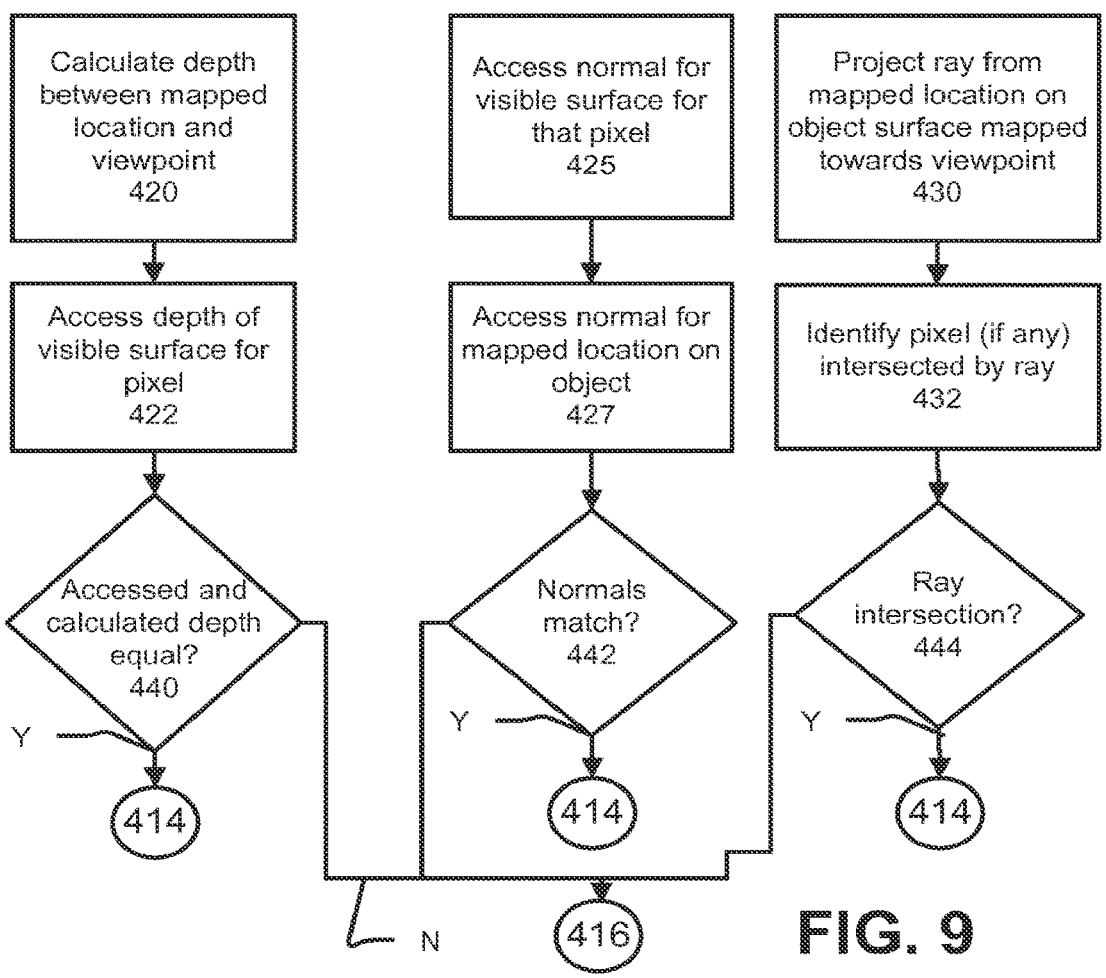
FIG. 9

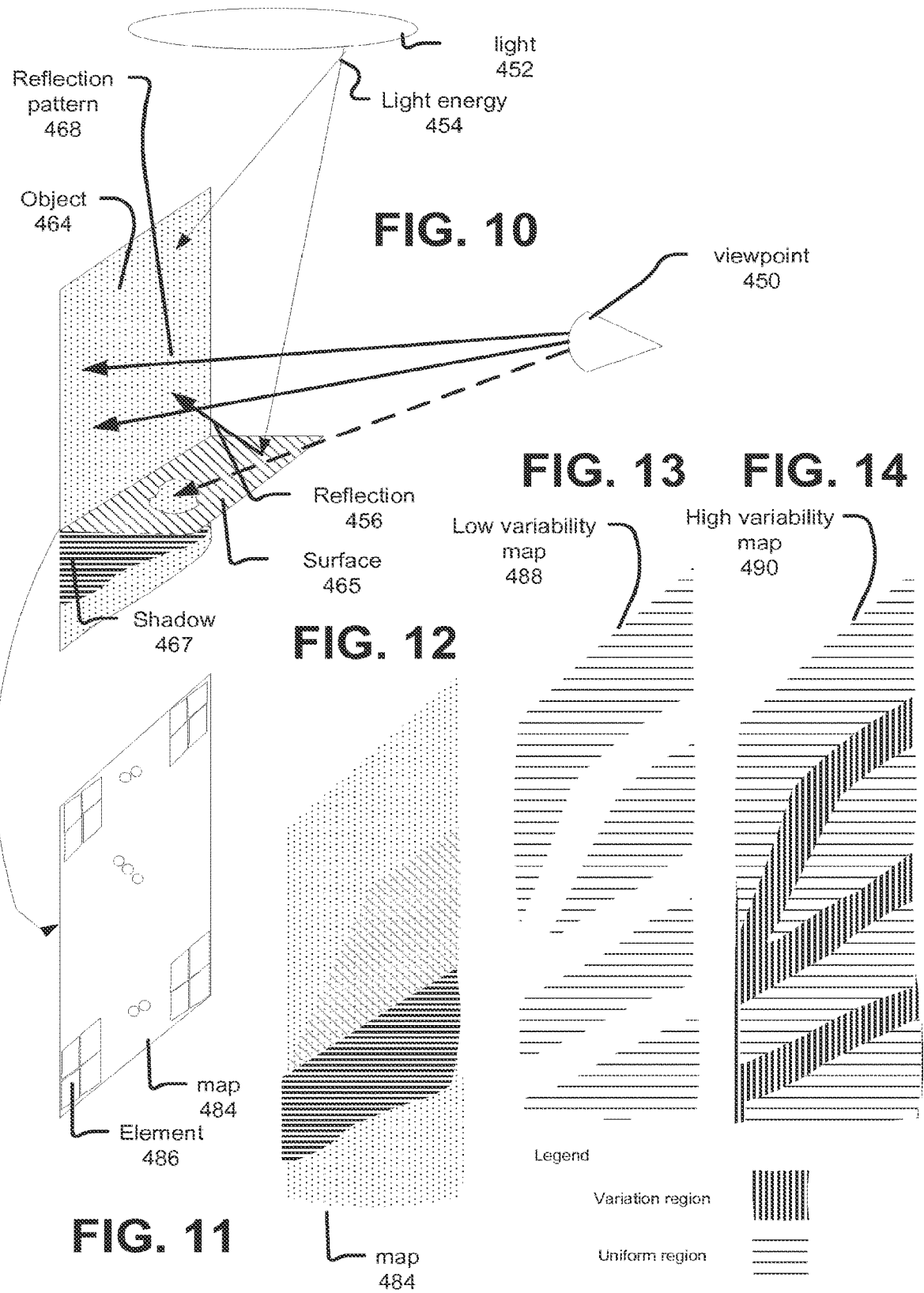

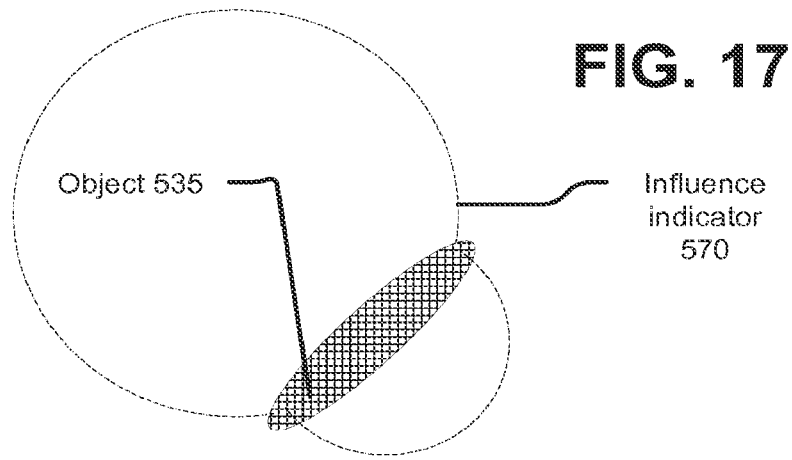
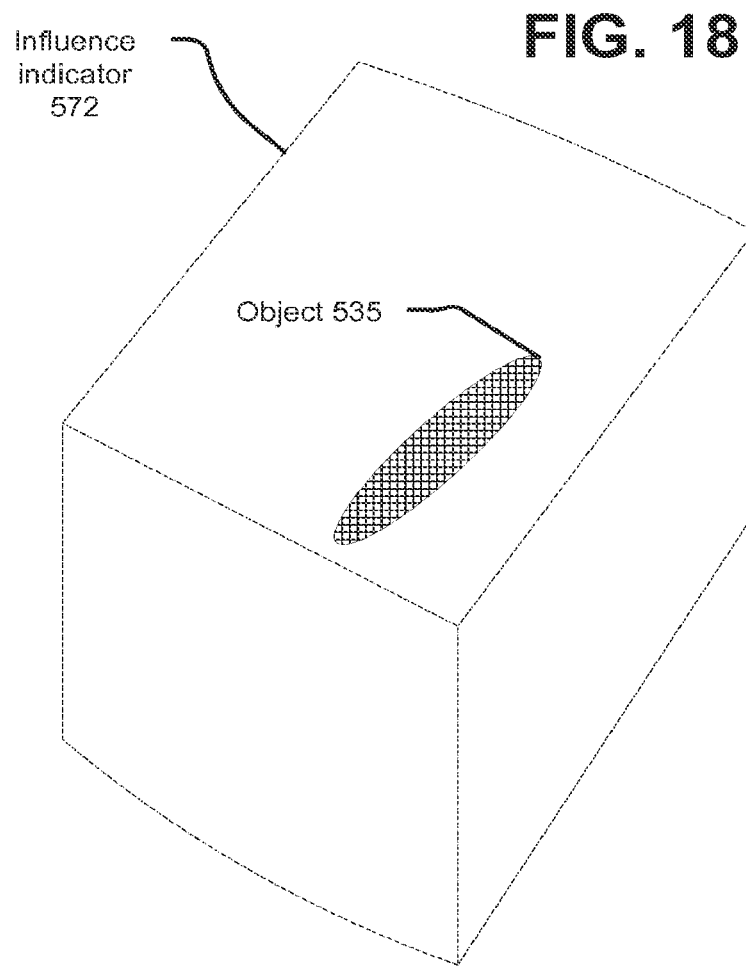

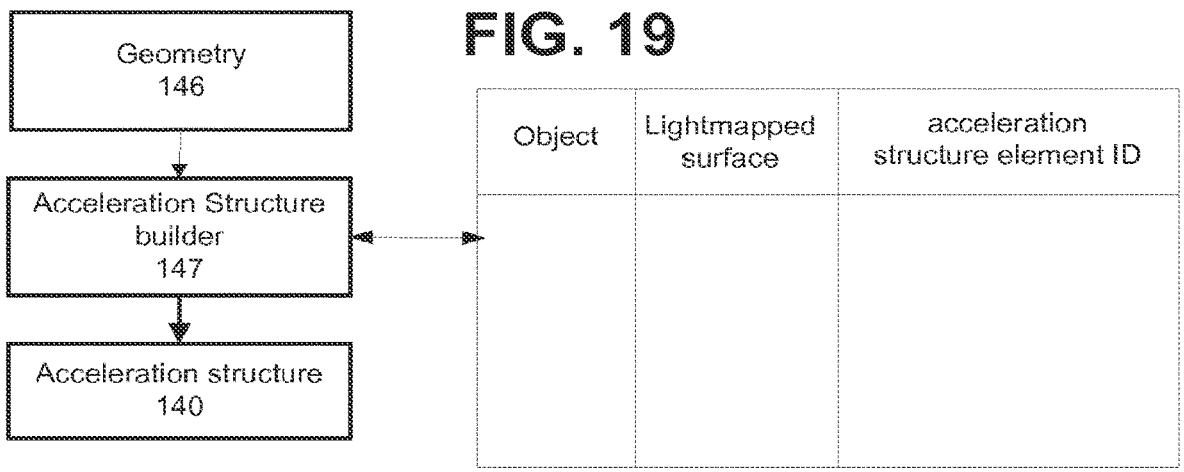
FIG. 19
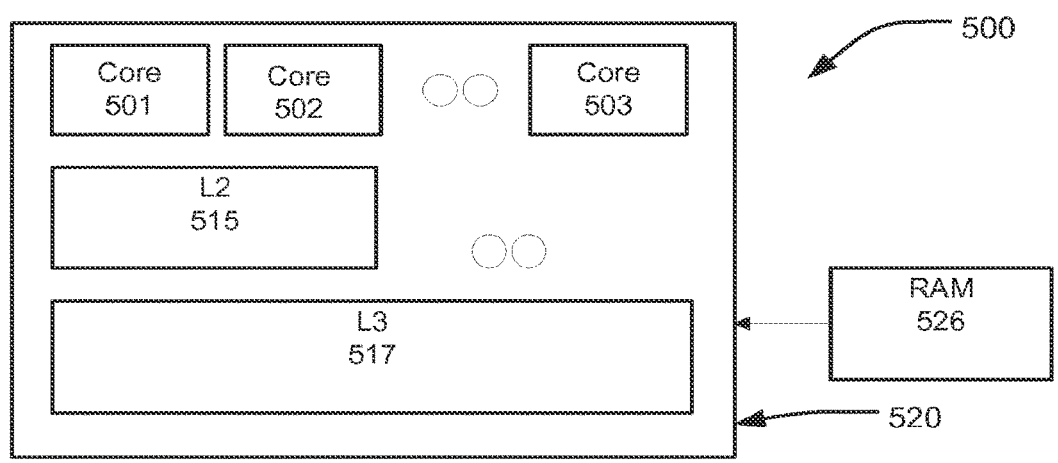
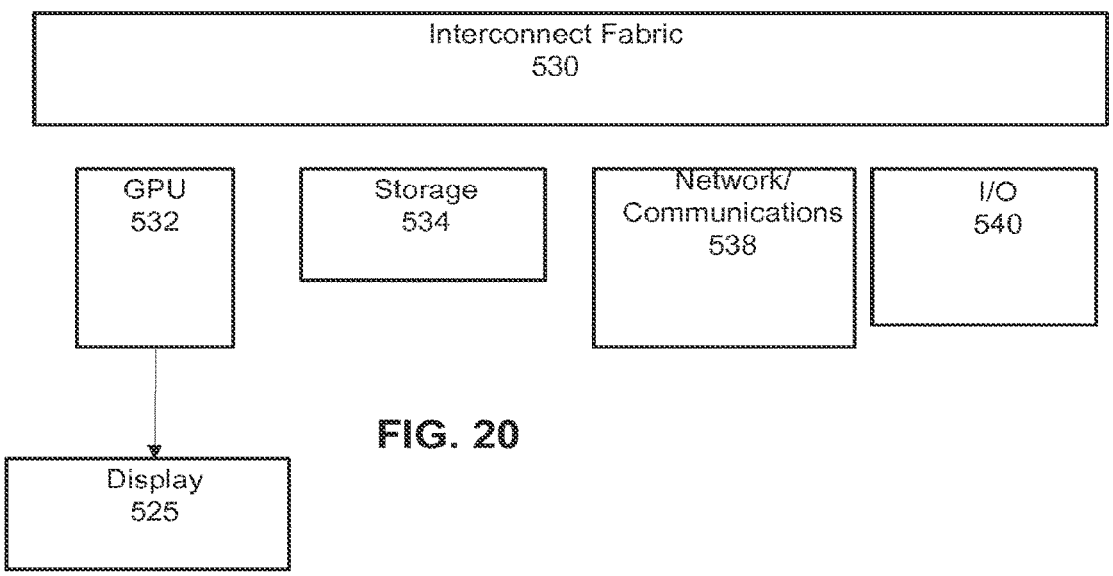
FIG. 20

OBJECT ILLUMINATION IN HYBRID RASTERIZATION AND RAY TRACED 3-D RENDERING

CROSS REFERENCE TO RELATED APPLICATIONS

This application is a continuation of copending application Ser. No. 16/107,812 filed Aug. 21, 2018, which is a continuation of prior application Ser. No. 14/644,830 filed Mar. 11, 2015, now U.S. Pat. No. 10,083,541, which claims priority from U.S. Provisional App. No. 61/952,371, filed on Mar. 13, 2014, and entitled "Object Illumination in Hybrid Rasterization and Ray Traced 3-D Rendering", which are incorporated by reference in their entirety herein for all purposes.

BACKGROUND

In one aspect, the disclosure generally relates to 3-D rendering systems, system architectures, and methods, and in a more particular aspect, the disclosure relates to systems, architectures, and methods for asynchronous and concurrent hybridized rendering, such as hybridized ray tracing and rasterization-based rendering.

DESCRIPTION OF RELATED ART

Graphics Processing Units (GPUs) provide highly parallelized rasterization-based rendering hardware. A traditional graphics processing unit (GPU) used a fixed pipeline only for rendering polygons with texture maps and gradually evolved to a more flexible pipeline that allows programmable vertex and fragment stages. Even though modern GPUs support more programmability of geometry and pixel processing, a variety of functions within a GPU are implemented in fixed function hardware. Modern GPUs can range in complexity, with high performance GPUs having transistor budgets on the order of 4-6 billion transistors. GPUs are often used in real time rendering tasks, and optimizations for many GPU applications involve determining shortcuts to achieve a desired throughput of frames per second, while maintaining a desired level of subjective video quality. For example, in a video game, realistic modeling of light behavior is not necessarily an objective; rather, achieving a desired look or rendering effect is often a principal objective.

Traditionally, ray tracing is a technique used for high quality, non-real time graphics rendering tasks, such as production of animated movies, or producing 2-D images that more faithfully model behavior of light in different materials. In ray tracing, control of rendering and pipeline flexibility to achieve a desired result were often more critical issues than maintaining a desired frame rate. Also, some of the kinds of processing tasks needed for ray tracing are not necessarily implementable on hardware that is well-suited for rasterization.

SUMMARY

In one aspect, a 3-D rendering process comprises determining, for each frame of a sequence of frames, visible surfaces for pixels in the frame, from a respective viewpoint. The pixels are shaded. Shading of the pixels involves, for at least some of the pixels, sampling a texture that is mappable to a surface visible at one or more of the pixels. The method also provides for maintaining the texture during one or more of the determining of the visible surfaces and the shading by performing sampling operations for a selection of elements in the texture and performing a combining of existing data and results of the sampling.

In one aspect, the determining of visible surfaces for pixels in the frame comprises rasterizing a set of geometry based on the respective viewpoint for the frame, and the maintaining comprises, concurrent with the rasterizing, performing a surface-specific lighting process. The surface-specific lighting process involves emitting rays from distributed points on a surface of an object in the 3-D scene, traversing the emitting rays to identify respective intersections between the rays and objects in the 3-D scene, and shading the intersections between the rays and respective objects that were intersected. The shading comprising determining an effect on one or more of the distributed points on the surface of the object and updating a non-transitory memory storing current lighting condition data for the distributed points on the surface of the object. The rasterizing comprises accessing the current lighting condition data for one or more of the distributed points, in response to determining, during the rasterizing, that those one or more distributed points are visible in a frame of the sequence of frames.

The texture may describe ambient lighting conditions on one or more objects to which that texture maps. The maintaining may comprise emitting rays for only a portion of the elements in the texture, during rasterizing of each frame in the sequence, and performing a weighted combination of results of the emitted rays with existing values for the samples to which the rays pertain.

The maintaining of the texture may involve controlling usage of a processing engine to maintain a pre-determined set of light maps in a non-transitory memory. Different light maps of the set can be associated with different objects in a 3-D scene. Data in the light maps persists in the non-transitory memory across multiple frames in the sequence of frames.

The maintained texture can be stored in memory, to which a rasterization process can be provided read access while the texture is being maintained.

A budget may be allocated for how much sampling can be performed for the texture during each of the frames, in order to meet a target frame rate at which the sequence of frames is to be displayed. Element selection for sampling can be prioritized based on a likelihood that those elements map to locations on the surface that will be visible at one or more pixels in a frame of the sequence of frames.

The likelihood that elements map to locations on the surface that are visible can be determined by comparing a respective normal of the surface at a location to which an element of the texture maps, with a normal of a visible surface stored in a buffer produced by the determining, for each frame of a sequence of frames, visible surfaces for each pixel of the frame, from the respective viewpoint of that frame. The likelihood that elements map to locations on the surface that are visible also or instead can be determined by tracing a ray from a location to which an element of the texture maps towards the respective viewpoint of that frame, and determining whether the ray hits any geometry in the 3-D scene. The likelihood that elements map to locations on the surface that are visible also or instead can be determined by calculating a depth from a location to which an element of the texture maps to the respective viewpoint of that frame, and comparing the calculated depth with a depth stored in a buffer produced by the determining, for each frame of a sequence of frames, visible surfaces for each pixel of the frame, from the respective viewpoint of that frame.

Implementations of the disclosure can be provided in graphics processors, general purpose processors, or systems on chip having multiple components. Functions may be implemented with programmable or fixed function or limited configurability circuitry.

These and many other variations and options that can be implemented are disclosed herein.

BRIEF DESCRIPTION OF THE DRAWINGS

For a fuller understanding of aspects and examples disclosed herein, reference is made to the accompanying drawings in the following description.

FIGS. 3-5 depict aspects of timing constituent processes in a rendering pipeline in which multiple frames can be processed concurrently;

FIG. 8 depicts an example process by which portions of a lightmap can be selectively identified for sampling;

FIG. 9 depicts aspects of an example process that can be used in the process of FIG. 8;

FIG. 10 depicts an example toy scene in which a lightmap is mappable to a surface and updated;

FIG. 11 depicts further a grid arrangement of an example lightmap;

FIG. 12 depicts an example lightmap modeled based on the scene of FIG. 10;

FIGS. 13 and 14 depict variability maps that can be used as inputs to sampling control processes according to the disclosure;

FIGS. 17 and 18 depict examples of associating regions of influence indicators with scene objects;

FIG. 19 depicts a portion of a rendering pipeline relating to producing an acceleration structure and data that can be maintained by the acceleration structure;

FIG. 20 depicts an example system in which aspects of the disclosure can be implemented.

DETAILED DESCRIPTION

Figure 1:
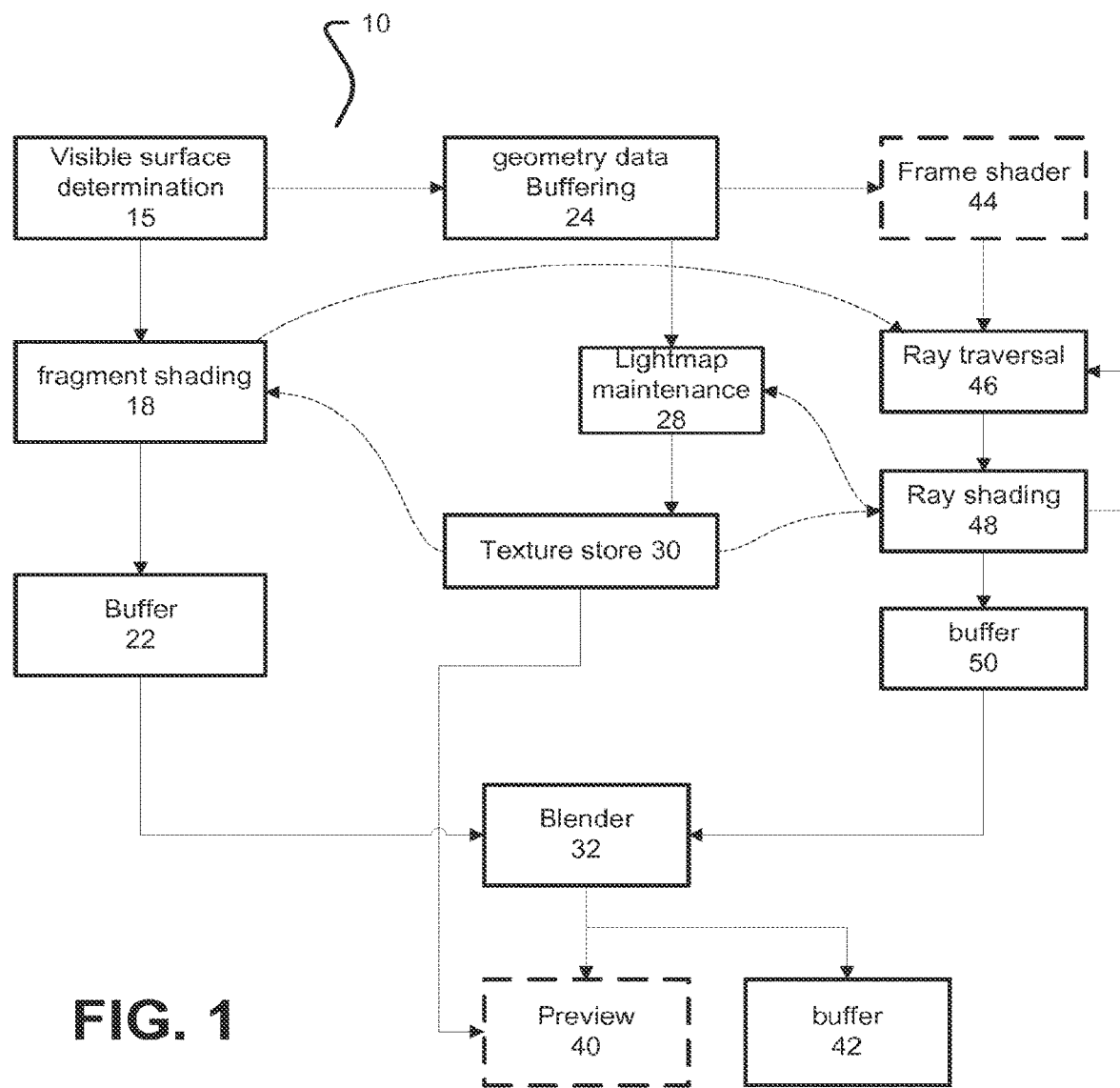
FIG. 1 depicts an example rendering pipeline in which can be implemented aspects of the disclosure.

The following description is presented to enable a person of ordinary skill in the art to make and use various aspects of the inventions. Descriptions of specific techniques, implementations and applications are provided only as examples. Various modifications to the examples described herein may be apparent to those skilled in the art, and the general principles defined herein may be applied to other examples and applications without departing from the scope of the invention.

In general, systems and methods of rasterization have developed and been implemented largely separate from systems and methods of ray tracing, Rasterization has most often been used for real-time applications, and where constraints, such as computation or cost limits preclude usage of ray tracing. In contrast, ray tracing has more often been used in offline applications, where quality or physical correctness are valued more than frame rate, and/or computation cost. In one aspect, the disclosure relates to usages of ray tracing to support rasterization-based 3-D rendering. Some aspects of the disclosure relate to maintenance of lightmaps using ray tracing during ongoing rendering operations.

In an example according to the disclosure, a lightmap is a two-dimensional data structure, with elements that are addressable by parametric coordinates. Each element is mappable to a location on a surface in the 3-D scene. For example, the surface may be a surface of an object. In this context, it should be understood that each element may map to an area of a surface. How each element is mapped can depend on a shape of the surface. For example, elements will map differently to a curved surface than to a flat surface. Also, as explained further below, such mapping may include blending one element with other elements that are mapped to the surface at adjacent locations, for example. Also, a lightmap may have versions created at different resolutions for the same object surface, and a version may be selected based on distance from a viewpoint, for example, or a level of detail indicator. As such, disclosure concerning mapping to a 'location' is to be understood in these contexts, and that this terminology does not imply mapping an element to a single point, or an invariant area, or that the location be entirely distinct from locations to which other elements are mapped, and so forth.

A lightmap contains information that describes lighting conditions for the surface to which that lightmap is mappable. In aspects of the disclosure, the information contained in a lightmap is a result of a sampling strategy that may be selected according to implementation-specific considerations. Implementations may use sampling strategies designed to characterize global illumination conditions, such as diffusely scattered light, e.g., diffuse inter-reflections, specular reflection from intermediate surfaces, and non-directional lighting.

Characterizing global illumination involves much more sampling, in general, than characterizing direct lighting conditions. Characterizing global illumination can use a variety of sampling techniques, such as biased and unbiased techniques. In this disclosure, the term "ray tracing" includes variants and refinements thereof, including Monte Carlo sampling techniques, such as path tracing and distributed ray tracing, as well as beam and cone tracing, As such, the term "ray tracing" does not imply a particular limitation on a number of rays that are cast for sampling an element of a lightmap, or which are cast to sample different domains, or a limitation on a number of secondary rays that may be generated.

FIG. 1 depicts a pipeline 10 for rendering 2-D images from 3-D scene information. Such pipeline may include some elements that use rasterization techniques and other elements that use ray tracing techniques. Some implementations support background processes that perform ray tracing operations to maintain global illumination data for surfaces of objects in the 3-D scene. A visible surface determination module 15 is coupled to output data for visible surfaces to a buffer 24 for buffering data for visible surfaces. Further details concerning FIG. 1 are disclosed after description of FIG. 2, below.

Figure 2:
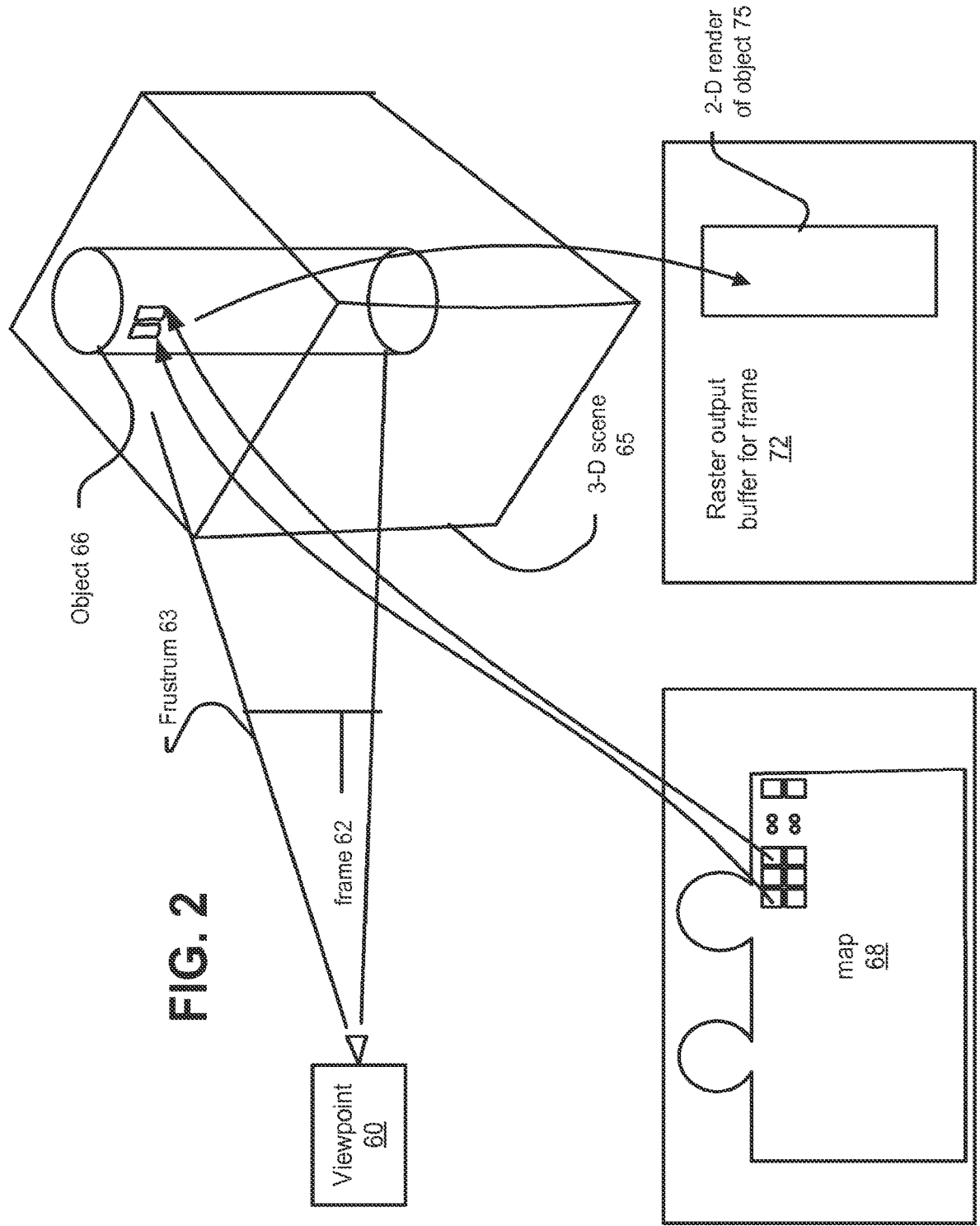
FIG. 2 depicts an example toy 3-D scene, mapping elements from a lightmap to a an object in the 3-D scene, and raster outputs.

With reference to FIG. 2, a viewpoint 60 and a frame of pixels define a view frustrum 63 into a 3-D scene 65. An object 66 is located in 3-D scene 65. Visible surface determination module 15 determines a surface for each pixel in frame 62. Data for frame 62 can be stored in an output buffer 72, and as shown, depicts a 2-D view 75 of object 66.

Rasterization of frame 62, in one implementation, includes identifying one or more visible surfaces for each pixel in frame 62. In some situations, fragments of multiple different surfaces may be visible in a single pixel. In one implementation, visible surface determination module 15 performs a rasterization process by which 3-D objects are projected onto frame 62, in order to determine which pixels each 3-D object overlaps, and then determine, based on depth from viewpoint 60, which object is visible. A rasterization pass can be implemented using an immediate mode approach, by which shading operations may begin before a final visible surface for a pixel is determined, or a deferred approach, by which geometry is first projected onto frame 62, and binned according to region, and then a visible surface is determined before shading begins. As an example, FIG. 4 depicts that object 66 is visible and rasterization produces a 2-D render 75 for object 66 that is stored in buffer 72. Although eventually, a product of rendering may be a color and intensity information for each pixel (after shading), buffer 72 here is characterized as storing values that are used for such shading, rather than a product of shading. As such, buffer 72 depicts which a mapping of visible surface to pixel, which controls what data will be stored in buffer 72. Special circumstances such as translucency of a closest surface may also be handled by visible surface determination module 15 (e.g., data for multiple surfaces may be stored in one example). Some implementations may handle these circumstances uses ray tracing procedures, as explained below.

Data produced by visible surface determination module 15 may include an identifier for a visible surface, parametric coordinates for a location on the visible surface that is visible, a depth to the visible surface from a viewpoint, interpolated values for parameters (e.g., colors, normals) associated with vertices defining the visible surface.

Visible surface module 15 also couples with a fragment shading module 18. Fragment shading module 18 may be implemented using programmable computation elements, for example, and may execute code for determining some aspects of how different pixels will appear in the frame 62 of pixels. Such fragment shading may include texture sampling operations from a store 30 of texture data, as well as other computations that can use parts of the data generated by visible surface determination module 15. These fragment shading operations can result in data to be output for buffering 22.

A light map maintenance element 28 may be implemented. Light map maintenance element 28 can use data produced by visible surface determination module 15, and stored in buffering 24. Light map maintenance element 28 performs ray-tracing based sampling of global illumination conditions on surfaces of objects located in 3-D scene 65. As an example, in FIG. 2, a light map 68 for object 66 presents a 2-D surface that can be mapped, through a parameterized mapping to a surface of object 66. Light map 68 includes a plurality of elements, each of which can be addressed by a parameterized coordinate pair. How each element of light map 68 is mapped to the surface of object 66 may differ in different circumstances. Light map 68 may be stored in texture store 30, which also may contain other texture information. Aspects of the disclosure relate to examples of how light map maintenance process 28 can perform in the context of other functions that are performed during rendering, and examples of processes, systems, apparatuses, and usages of implementations of the disclosure.

In addition to ray tracing for maintenance of global lighting information on surfaces, ray tracing may be conducted as a result of rays emitted by shaders running during fragment shading 18. Rays emitted by fragment shaders may be provided to a ray traversal module 46, in order to determine an intersection for each ray. In another implementation, a frame shader 44 may be executed for pixels of frame 62. For example, frame shader 44 may input visible surface information for each pixel, and then based on that information, define a ray or rays to be traced for at least some of the pixels. These rays may be emitted from the visible surface, and can be for such purposes as handling reflections, refractions, sampling direct illumination conditions from lights in 3-D scene 62, and so on. Rays emitted by frame shader 44 also may be traced by ray traversal module 46. Ray traversal module may output intersection data (e.g., identifying a surface intersected for each ray) to a ray shading module 48.

Ray shading module 48 may invoke code to be executed, in order to determine what effect each ray intersection should have. In an example, fragment shading 18 and ray shading 48 are implemented on a programmable set of processing elements, such as a set of parallel processing cores, which may support execution according to a single instruction multiple data execution model.

Results of shading rays that were emitted for lightmap maintenance 28 may be returned to lightmap maintenance module 28. Rays that were emitted by either fragment shading 18 or frame shader 44 may have results accumulated into a buffer 50. Ray shading 48 may cause additional rays to be created for traversal, which can be traversed by ray traversal module 46.

Results from fragment shading 18, which can be buffered in buffer 22, and results from ray shading 48 (which can be buffered in buffer 50), can be blended in a blender 32. Blender 32 may be implemented by a programmable processor that is configured to combine different inputs or a fixed function circuit or a combination thereof. In one application, an output of blender 32 may be used to provide a preview 40 output for a user interface to a graphical application design tool or development environment. Also, preview 40 may include outputs from texture store 30 that show a current status or contents of a lightmap maintained by lightmap maintenance module 28. In some implementations, preview 40 can implement a preview window that shows a version of a 3-D scene to which has been mapped elements of a lightmap maintained according to the disclosure. The preview 40 can be updated as any one or more of viewpoint, geometry, and lighting conditions change. Preview 40 also can display a 2-D view of the lightmap itself. Preview 40 may be used in conjunction with an editing or development environment, such as a development environment for 3-D programs, such as applications, including interactive applications and games.

In another example, blender 32 may output data to be stored in a buffer 42. Buffer 42 may be read by a display interface, for an application such as a game or other interactive graphical application, such as a modeling software, a virtual reality application, an augmented reality application, a renderer, and so on. Buffers 42, 22 and 50 may be implemented by memory allocated from a memory hierarchy. In some cases, portions of such buffers may be implemented in dedicated memory elements. Memory elements used to implement any of these buffers also may be used to store data used by or generated by different components of a rendering pipeline. Lightmaps may be accessed as textures from a texture store, by processes implementing fragment shading operations, for example. Further details concerning aspects of such light map maintenance are disclosed below.

FIGS. 1-2 presented an overview of a 3-D rendering pipeline 10 that uses both rasterization elements and ray tracing elements. More particularly, pipeline 10 also can support maintenance of lightmaps for surface(s) of 3-D objects within a 3-D scene from which renderings may be produced. Some implementations of the disclosure are used for providing real time rendering, animation, or preview modes, for example, in which a sequence of frames are displayed within a portion of time. For example, 60 or more frames per second may be generated and displayed. Implementations of the disclosure can have multiple frames in flight.

FIGS. 3-5 present different perspectives on how different processes and computations can be structured to implement aspects of the disclosure. FIG. 3 depicts a sequence of time intervals (T0-Tn), and during such time intervals, a respective frame of pixels is displayed (display times 102-104 depicted). The values for the pixels in the frames displayed during these display times 102-104 were calculated in respective processing times 110-112. Such processing times may occur during display times for one or more prior frames. In some implementations, such processing time for one frame may overlap multiple display times. Some operations performed for a given frame have dependencies, prior to initiating that computation.

FIG. 4 depicts an example of pipelining of processing of rendering for multiple frames. For example, in order to process each frame, a visible surface determination process is conducted ("V.S. Det." 115-117). Other operations that are depicted in the example include direct illumination 120, fragment shading/texture sampling 121, blending 122, and outputting 123. The depiction is not to scale, in terms of relative amounts of computation or time required for each operation. As these frames are being rendered, a lightmap maintenance process 138 operates concurrently. Lightmap maintenance process 138 uses inputs from some portions of the processes performed to render each frame, but also may operate asynchronously from the rendering processes. FIG. 5 depicts an example of dependencies that can exist, among different processes. Physics/user interface inputs can determine how a viewpoint will change between frames. Based on this, a viewpoint adjustment for a particular frame can be made. Also, geometry may have been added, removed, or changed, resulting in geometry preparations. Then, once scene geometry for the frame is known, an acceleration structure can be maintained or built. Also, as portions of geometry are finalized, rasterization of such geometry can be performed.

As shown in FIG. 1, some rays traced for a particular frame may be emitted by shading processes. However, as shown in FIG. 1, a process conducted by lightmap maintenance element 138 is decoupled from dependencies on particular shaders, and thus, lightmap maintenance can be performed after an acceleration structure is updated. In this example, lightmap maintenance can be deferred until an acceleration structure is updated, so that rays created for such lightmap maintenance can be traversed in the 3-D scene using that acceleration structure. The arrow for such lightmap maintenance shows that some implementations may not entirely stop the light map maintenance, although an amount of computation resources used for lightmap maintenance may be dynamically changed. However, it is desirable to perform as many light map updates as possible to those areas of the light maps that are deemed more likely to be sampled during fragment shading, for the frame currently being rendered. So, some implementations may more heavily load the light map calculations during a period in which rasterization is performed for that frame. At some point, visible surfaces for pixels of the frame arc known, upon which, fragment shading can occur (or, in the case of immediate mode rendering, such shading can occur even before an ultimate final visible surface is known.) Then, a remainder of rendering processes, such as those depicted in FIG. 4 may be performed.

FIG. 5 showed that light map maintenance does not require determining visible surfaces for pixels of frame(s) being rendered. However, some implementations may allocate processing resources to prioritize light map maintenance for portion(s) of a light map determined to be mapped to visible surface(s). In one approach, inputs from one or more of physics and user interface elements are used to determine a setup for a 3-D scene, which will be used to render a frame in a sequence of frames. For example, physics or user interface inputs may affect geometry in the 3-D scene, and may affect a viewpoint. For these purposes, factors such as programmatic inputs during game play can be characterized as physics inputs. Geometry preparations are undertaken to account for modifications to geometry, to provide finalized geometry. Acceleration structure (A.S.) preparation can be undertaken using the finalized geometry.

Finalized geometry also can be used to begin rasterization of the 3-D scene, in order to identify visible surfaces for the pixels of the frame. In some cases, generation of rays for light map maintenance can be conditioned on finalization of the acceleration structure. After rasterization identifies a visible surface, fragment shading of that visible surface can begin (depending on an approach to rasterization, such visible surface may be a final visible surface or a surface that is currently visible, although it may be obscured later.) Fragment shading may involve sampling textures that are mapped to objects that are visible at one or more pixels in the frame. These textures can include those being maintained using results of the tracing and shading of the light map rays that are being processed for light map maintenance. Fragment shading may include emitting rays for purposes such as testing reflections, occlusion, or refractions. Some implementations also may provide a ray frame shading step, in which rays are emitted based on characteristics of surfaces visible at pixels of the frame. A portion of rendering time may be allocated to blending various component results, and ultimately, a time to display the frame is reached.

Figure 6:
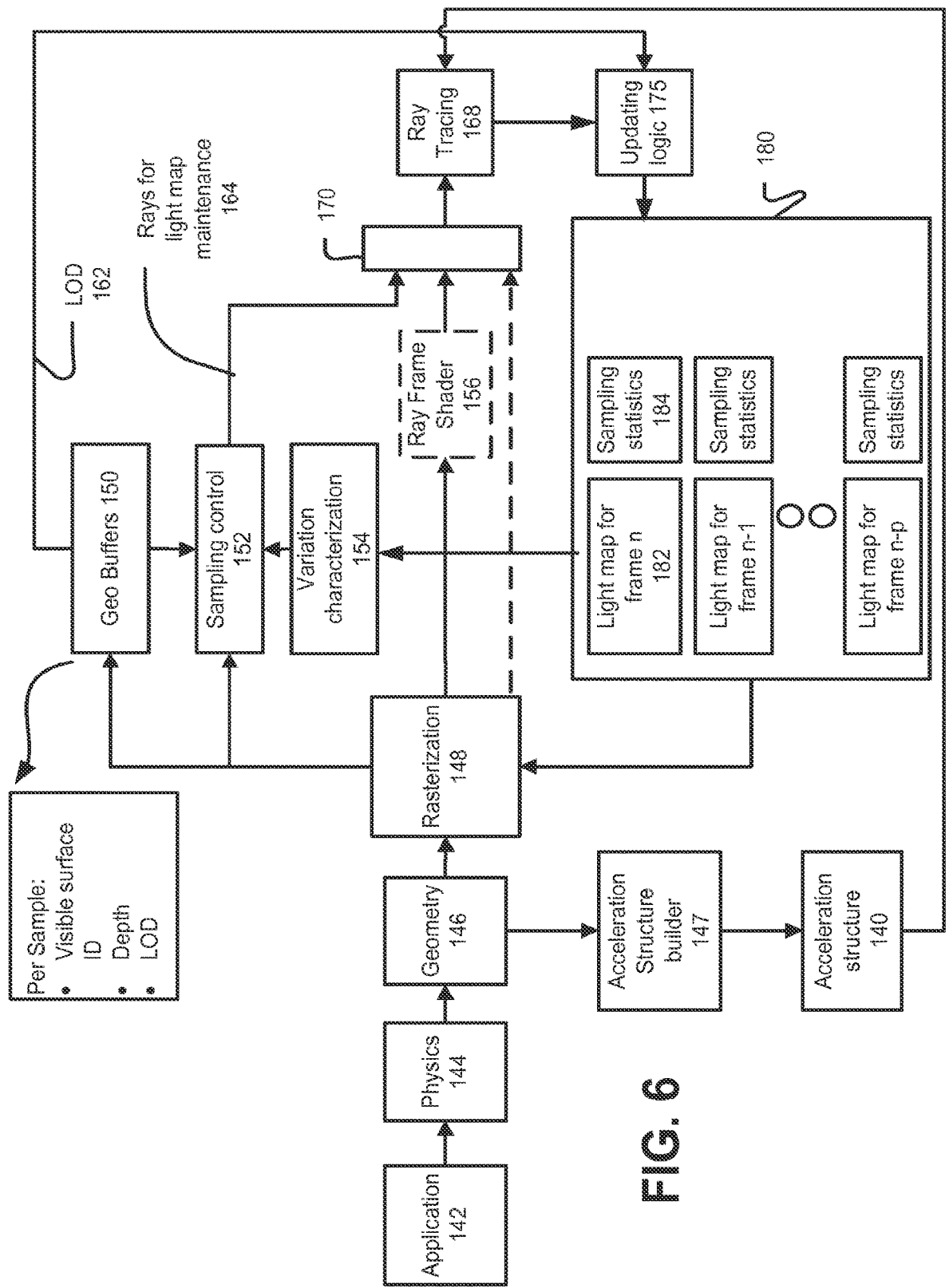
FIG. 6 depicts a rendering pipeline that uses a hybridization of rasterization and ray tracing.
Figure 7:
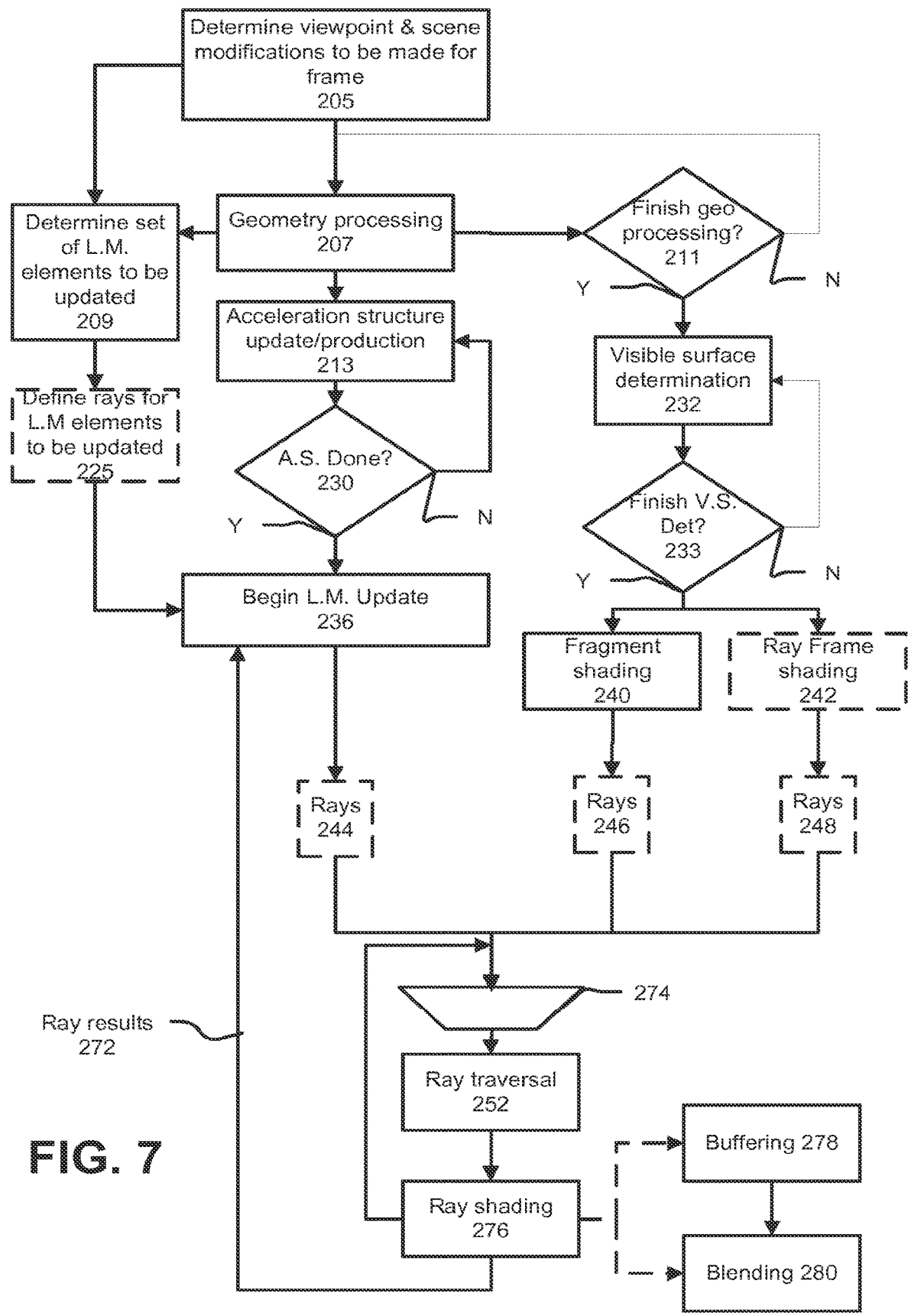
FIG. 7 an example process for updating lightmaps in a pipeline according to the example of FIG. 6.

FIG. 6 depicts an example graphics processing pipeline implementing aspects of the disclosure. FIG. 7 depicts an example of a scheduling process that may be implemented in the pipeline of FIG. 6. In FIG. 6, an application 142 generates outputs, on which rendering will be based. Such outputs include geometry specifications, inputs indicative of user interaction, materials information, and so on. A physics engine 144 can process data from application 142 to determine how such data will affect a 3-D scene; physics engine 144 can, for example, determine updates to a position, a speed, direction of objects or whether an object will be broken up into multiple separate objects, identify collisions among objects and results of such collisions, and so on. A geometry processing element 146 can receive inputs from physics 144 and output geometry according to the inputs. For example, physics engine 144 may specify objects as higher order surfaces, and geometry processing element 146 may process these higher order surfaces into a primitive mesh.

Rasterization subsystem 148 receives geometry from geometry processing element 146 and begins visible surface determination based on the geometry. A variety of approaches to visible surface determine exist, and include, for example, a tile-based rendering option, in which geometry is first sorted according to regions of a frame overlapped by each geometry element, and immediate mode rendering, in which pixel shading is conducted without having identified a final visible surface for a pixel, even though such shading may be wasted computation, when another element of geometry obscures the prior element. Additionally, an acceleration structure builder 147 receives geometry data from geometry processing element 146. Such geometry data can be a simplified set of geometry, in an example. Acceleration structure builder 147 may produce or update an acceleration structure 140 based on the geometry. Some implementations can support producing multiple versions of geometry, where a relatively high resolution version of geometry is used for rasterization and a reduced resolution version of geometry is used for ray tracing. An acceleration structure can be produced based on the higher, the lower, or both versions of geometry. Some implementations can support tracing some rays based on the high resolution geometry, and some rays based on the low resolution geometry. For example, rays for maintaining lightmaps can be traced using the higher resolution geometry, and reflection or refraction rays generated by materials shaders can be traced using the lower resolution geometry.

An output of rasterization 148 includes geometry data buffers 150, which include per-pixel (per fragment) geometry data, such as a depth of a visible surface, a level of detail indicator, an interpolated normal, parametric coordinates of a location on the surface visible at a given pixel, and so on. Such buffers 150 also may include interpolated parameters that were associated with vertices of geometry defining the surface visible at that pixel.

Rasterization 148 also includes a fragment shading subsystem, which operates to determine a color of a pixel. Such fragment shading subsystem may output rays to be traced by a ray tracing subsystem 168. Rasterization 148 also may access a texture memory 180 that stores texture data. Texture memory 180 may be implemented by a memory hierarchy, some portions of which are shared with other functions, while other portions may be dedicated to texture accesses. Texture memory 180 is shown as storing light maps (e.g., light map for frame n 182), each of which are mappable to a surface of an object. Also, multiple versions of a light map for one object may be maintained for multiple frames. Such multiple versions may be implemented as a baseline map, and the other maps may be represented as differences from that baseline map. The surfaces of the objects may or may not be visible in frames being rendered.

A sampling control 152 is for updating light map data stored in texture memory 180. Such updating proceeds concurrently with other rendering processes, and results in updates to the light maps that are then capable of being accessed as textures by rasterization 148. In some implementations, sampling statistics 184 are maintained for each light map. Sampling statistics may include sample aging data. For example, an indication of when sampling was last conducted for a given texture element may be maintained. A variation characterization module 154 operates to characterize variations of elements of the light maps (e.g., 184), and may also update sampling statistics 184. For example, variation characterization 154 can operate to identify regions of light map 182 that have low variation within that light map, can operate to identify elements that have had relatively high variation among samples taken within one frame, or within multiple frames. Outputs from variation characterization 154 are inputs to sampling control 152. Sampling control 152 also accesses data from geometry buffers 150. Sampling control 152 can generate specifications for rays 164 to be traced in order to update one or more light maps.

A ray frame shader 156 also may be invoked, which can execute to generate rays to be traced from the visible surfaces for which fragment shading is being conducted by rasterization 148. A number of and characteristics of the rays emitted by ray frame shader 156 for each visible surface can vary based on characteristics of such surface. The rays emitted by rasterization 148, by ray frame shader 156, and by sampling control 152 can be collected into a buffer 170, which feeds ray tracing subsystem 168. Ray tracing subsystem 168 can be implemented as a ray traversal element and a ray shading element. The ray shading element can return results of shading a particular ray to the emitter of such ray. Ray shading also may include emitting additional rays to be traced. Ray tracing subsystem 168 can use acceleration structure 140 during ray traversal. With particular regard to light map maintenance, updating logic 175 can receive results for tracing rays 164, and combine those received results with existing data to update an appropriate light map. Updating logic 175 also can use level of detail indicators from geometry buffers 150 in order to determine how to update a given light map based on sample data.

FIG. 7 depicts, at 205, determining a viewpoint and a 3-D scene, for a particular frame in a sequence of frames. In one example, the particular frame may be a temporally subsequent to a frame for which determining 205 was performed. Such viewpoint and 3-D scene can be based on modifications to a temporally prior viewpoint and 3-D scene. One or more other frames may be in various stages of processing when action 205 is performed. At 209, a set of light map elements to be updated for that combination of viewpoint and 3-D scene are determined. Inputs from geometry processing 207 can be used in performing action 209. Geometry processing 207 may include defining a final set of geometry for rasterization, ray tracing, or both, for the particular frame. Acceleration structure updating/production, at 213, may use finalized geometry from geometry processing 207. In another example, a portion of an acceleration structure may be produced based on information defining extents of procedurally-defined geometry. In some implementations, portions of the acceleration structure may be completed before others. At 230, upon completing the acceleration structure, or a relevant portion thereof, a lightmap update can commence at 236.

In examples according to the disclosure, light map updating involves tracing rays in the 3-D scene, and a variety of different approaches exist to trace rays in a 3-D scene. Some implementations may always begin tracing rays from a root node of an acceleration structure, while others may begin tracing rays at other points within an acceleration structure, or in limited circumstances, may not even use an acceleration structure. As such, use of an acceleration structure and beginning a lightmap update after completing an acceleration structure are example implementations, but are not exclusive.

At 225, rays may be defined in accordance with the set of lightmap elements, based on the viewpoint and 3-D scene modifications, and inputs from geometry processing 207. As such, defining rays for lightmap updating does not need to be conditioned on completion of an acceleration structure, even if commencement of traversal of such rays is conditioned on completion of the acceleration structure. In one particular approach, a coarse-grained set of elements in a hierarchical acceleration structure is defined, and detailed acceleration structure elements are defined in a demand-driven manner. In such approach, light map updating 236 may begin after the coarse-grained set of elements is defined. FIG. 7 also depicts that rays 244 may be generated by lightmap updating 236.

Light map update 236 outputs rays 244, which are collected by a ray collector 274, for ray traversal 252. While the above actions are undertaken, a decision whether geometry processing is completed can be performed at 211, and responsive to completion of geometry processing (for a part of the geometry in the 3-D scene or the entirety thereof), visible surface determination may begin at 232. Visible surface determination 232 may be implemented by a tile based approach, a tile-deferred approach, an immediate mode approach, a tiled immediate mode approach, and so on. Various approaches to hidden surface removal can be employed in these approaches. According to a deferred shading approach, at 233, a decision whether visible surface determination has completed for a fragment, pixel or larger portion of the frame (e.g., a tile, or the whole frame of pixels) is performed, and if so, then shading of one or more fragments can be undertaken at 240. Fragment shading 240 can emit rays 246, in some implementations. Also, as visible surfaces are identified, a ray frame shader 242 may be executed. Ray frame shader 242 can function to emit rays 248 from visible surfaces. Whether or not a particular implementation supports fragment shaders emitting rays, or supports a ray frame shader, or both, is a matter of implementation, and an application programming interface can be provided that supports either or both. For example, if fragment shaders are to be able to emit rays, then a trace call may be provided that allows specification of a visible surface. That visible surface can be associated with a ray shader code module that is executed to define what rays are to be emitted. In another example, an interface accepts definitions of rays that are defined by code integrated within a fragment shader, or directly called by a fragment shader.

Ray traversal 252 outputs, to a ray shading unit 276, data for rays that have been found to intersect in the 3-D scene (such intersection can be with respect to an object, or to a background, for example, or any other condition under which a ray may need to be shaded). Ray traversal 252 may be organized according to a variety of approaches. In one example, rays can be collected according to commonality of computation to be performed (e.g., a traversal step within an acceleration structure, or testing a ray for intersection with one or more primitives), and also can be collected according to commonality of the data elements to be involved in the computation (e.g., collecting a set of rays that are to be tested for intersection with the same group of primitives). Ray traversal 252 can be implemented in a set of multi-threaded Single Instruction Multiple Data (SIMD) cores, or may use fixed function circuitry for performing functions, such as traversal or primitive intersection testing.

Ray shading unit 276 may output results 272 of shading rays that were emitted for light map updates (e.g., rays 244). These results are used to update the light maps to which those rays pertain; these ray results also may be used to determine subsequent samples to be taken for the lightmaps, if any. Ray shading 276 may output results to buffering 278 (e.g., executing code modules may contribute results of shading calculations to buffers in buffering 278, or may return results to a fragment shading or ray frame shading module, or both). A blending unit 280 may access results buffered in buffering 278 and combine these results according to blending instructions from ray shading 276. In some examples, blending 280 may be implemented at least partially on programmable computation elements that also implement one or more of ray shading 276 and fragment shading 240.

The above shows that implementations of the disclosure include apparatuses and processes that support 3-D rendering using both rasterization and ray tracing processes, and where ray tracing processes are used concurrently with rasterization processes to produce light map data that is accessible by rasterization shading processes. Such light map data can be maintainable across a sequence of frames, in which a portion of the elements in one or more light maps may be updated, while other elements are not updated. Examples of how selections of elements to be updated and other considerations are addressed below, with respect to FIGS. 8-18.

Some implementations of the disclosure focus on providing indirect illumination condition information for surfaces, which involves much more sampling than simple direct illumination. Further, some aspects of the disclosure focus on real-time production of lightmaps with indirect illumination data and under conditions in which one or more of a viewpoint, and geometry in the 3-D scene may be changing dynamically. Some aspects of the disclosure also focus on supporting real-time production, updating, or both, of lightmaps within computation and power budgets that fit within mobile device profiles, such as a smart phone, a tablet, a laptop, and so on. As such, it is expected that approaches to selecting subsets of elements within a lightmap for updating during a given frame in a sequence of frames (e.g., during usage of an application or game) may vary depending on the usage.

FIG. 8 depicts an example process by which elements of a lightmap can be selected for sampling. At 405, sampling is started or a subsequent iteration to a next lightmap element is conducted. Sampling can start at a location within a tightmap to be sampled, such as a pre-determined parametric coordinate value pair. At 408, that element is mapped to a location on an object surface (for example). At 412, a visibility determination process is performed, and based on results from that process, a determination is made whether that location is visible at one or more pixels of a frame. If visible, then that element is queued for sampling at 414 and otherwise, that element is skipped for sampling at 416. FIG. 9 depicts examples of visibility determination processes that can be performed in implementations.

FIG. 9 depicts that, at 420, a distance is calculated between the mapped location and a viewpoint of the frame to which the 3-D scene setup applies. The distance calculation may involve transforming a 3-D position of the location on the surface, based on a transform used to transform the geometry in the 3-D scene during rasterization. A line segment between the viewpoint and the location may traverse a pixel, or a fragment of a pixel of the frame. During rasterization, such pixel or fragment will have a depth value calculated and stored in a depth buffer. The depth value for that pixel or fragment is accessed at 422 and compared with a distance between the location and the viewpoint. If the accessed depth and calculated distance are equal (or within a range of each other indicative of being the same surface), then the location is considered visible. In another example, a normal for the visible surface at the pixel (or fragment), as determined by rasterization, is accessed at 425, and a normal for the mapped location is accessed (or calculated, such as through an interpolation) at 427. If the normal match, at 442, then the location is considered visible. As another example, at 430, a ray is projected from the mapped location to the viewpoint (or conversely, from the viewpoint to the mapped location) and if the closest intersection detected for the ray is at the mapped location, at 444, then the mapped location is considered visible. In some implementations, multiple of the approaches depicted in FIG. 9 can be used. For example, a first order test may use the normal, and for those elements that pass such test, a depth test may be performed, and for those elements that pass both tests, the ray test may be performed. In some implementations, only the ray test may be performed. Which tests and how many tests to be provided is an implementation-specific decision that balances a cost of the tests with an amount of sampling activity that is performed.

Further, the above example was that an element is either skipped for sampling or queued for sampling, based on a visibility determination. However, some implementations may select a degree of sampling based on an outcome of a visibility determination, an order of sampling, a degree of priority in sampling, or some combination thereof. In one example, some portion or all of the elements may have samples taken at one sampling rate, and then elements that map to locations considered likely to be visible can be sampled at a higher sampling rate. Other approaches are explained below.

FIG. 10 presents an example situation in which a lightmap may be produced and maintained. A light 452 emits light energy (e.g., light energy 454) into a toy 3-D scene including an object 464 and a surface 465. The 3-D scene is viewed from a viewpoint 450. In accordance with a relative position of object 464, surface 465, light 452 and viewpoint 450, a portion of object 464 on the same side of surface 465 as light 452 is generally directly illuminated by light 452. However, an area of object 464 separated from light 452 by surface 465 is in shadow 467. A reflection 456 of light energy 454 onto object 464 also is present, creating a reflection pattern 468. FIG. 11 depicts an example of a lightmap 484 for object 464, which includes elements (element 486 identified). These elements are created to have data representing the lighting condition on object 464, as exemplified in FIG. 12, in which map 484 is shown to include data representing shadow 467, and reflection pattern 468. Since FIG. 10 depicts that portions of object 464 are visible, rendering of pixels of a frame may include sampling lightmap 484 to retrieve data from lightmap 484. In order to create lightmap 484, sampling can be conducted for different elements towards light 452 (e.g., elements within shadow 467 would have values defined at least in part by samples that showed occlusion from light 452. Other samples would be taken towards surface 465, which in turn would generate secondary rays that would track back to light 452, so as to define reflection pattern 468.

FIG. 13 depicts an example of a region variability map 488, which can be produced based on values in lightmap 484. Variability map 488 identifies areas of relatively low variability, which can be termed uniform regions. In one approach, these regions are defined by a binary value, either indicating high or low variability. A threshold separating high and low variability can be selected in accordance with statistics concerning values for elements in the lightmap 484 and other information about the samples that produced such values. Some implementations may allocate two or more bits, such that binning of elements according to variability may be performed. In some implementations, a variability map can entries in a 1:1 correspondence with entries in lightmap 484. In other implementations, variability map 488 can be defined by regions, such as regions defined by simple polygons, such as rectangles, or an interconnected set of line segments. In some implementations, a coarse representation of areas of similar variability is sufficient, and in some implementations, such representation is made conservatively so that some areas of low variability may be included within an area of higher variability, so that a buffer zone is formed around high variability areas.

Also, in some implementations, a guard region can be defined around regions having higher variability. For example, a rate of change of variability may be used to identify areas around high variability regions. Areas which have a higher rate of change in variability between frames can be considered areas more likely to need more sampling. Variability can be determined within samples taken during a single frame and across samples taken during rendering of multiple frames. FIG. 14 depicts an example where a map 490 is created for high variability regions. Considerations and techniques disclosed with respect to map 488 of FIG. 13 can also apply to map 490 of FIG. 14.

Figure 15:
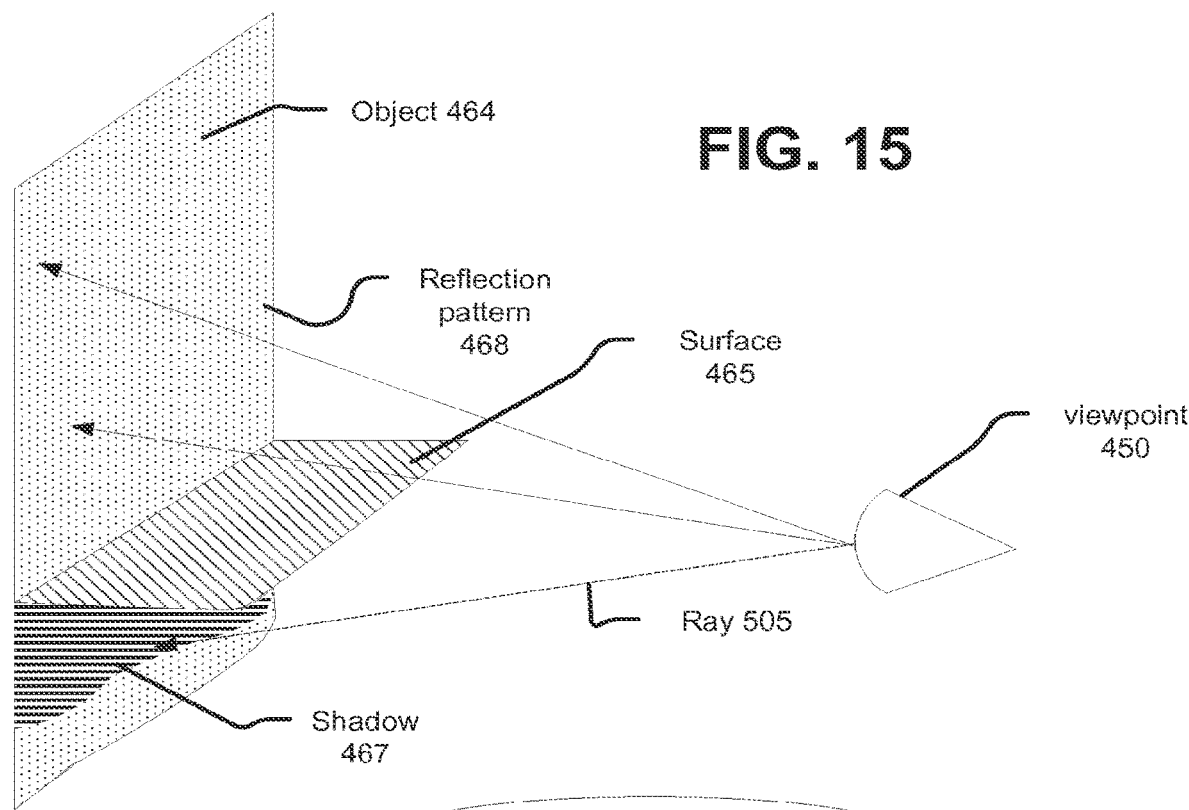
FIG. 15 depicts a toy scene in accordance with FIG. 10, with a changed viewpoint.

As introduced above, some implementations of the disclosure are for handling dynamic conditions that may affect light maps. FIG. 15 depicts a situation in which viewpoint 450 has moved, relative to a position depicted in FIG. 10. Such movement is relative to object 464, such that now a portion of object 464 in shadow 467 is visible at viewpoint 450, as shown by ray 505. In a practical example, a change in position of viewpoint 450 between FIGS. 10 and 15 may occur over multiple frames. As such, a gradual change in viewpoint can be detected, such as by using techniques in accordance with the disclosure above. For example, a portion of lightmap 484 that maps to a portion of object 464 close to an intersection between object 464 and surface 465 may have been only lightly sampled, or only sampled for direct illumination conditions. As such, such portion of lightmap 484 may have relatively coarse data, or hard shadows, for example. As more and more of such occluded portion of object 464 comes into view, more sampling can be performed in those regions. As explained above, such sampling can be based on a prediction of movement of viewpoint 450. In some implementations, a respective viewpoint for a plurality of frames may be determined before rendering begins for those frames. However, some aspects of lightmap sampling can begin, and in one example, selection of elements of a lightmap to be sampled can be performed based on predictions or determinations of a viewpoint for to-be-rendered frames.

In some implementations, sampling can be started for portions of a lightmap that have high variability, and then proceed outwardly from those portions into portions of lower variability.

Newly-acquired samples can be combined with existing lightmap data according to a weighted combination. For example, each new sample may have a weighting that is at last 10% of an element value. In some situations, an element may have had many more than ten samples obtained for that element, and as such, 10% represents a recency-weighted combination. Some implementations may select a weighting value based on changes that may have occurred between frames. For example, introduction of new geometry within a region of a lightmap may trigger a particularly heavy weighting of newly-acquired sample values, as well as more sampling of that lightmap, as explained in further detail below. The above is an example.

Figure 16:
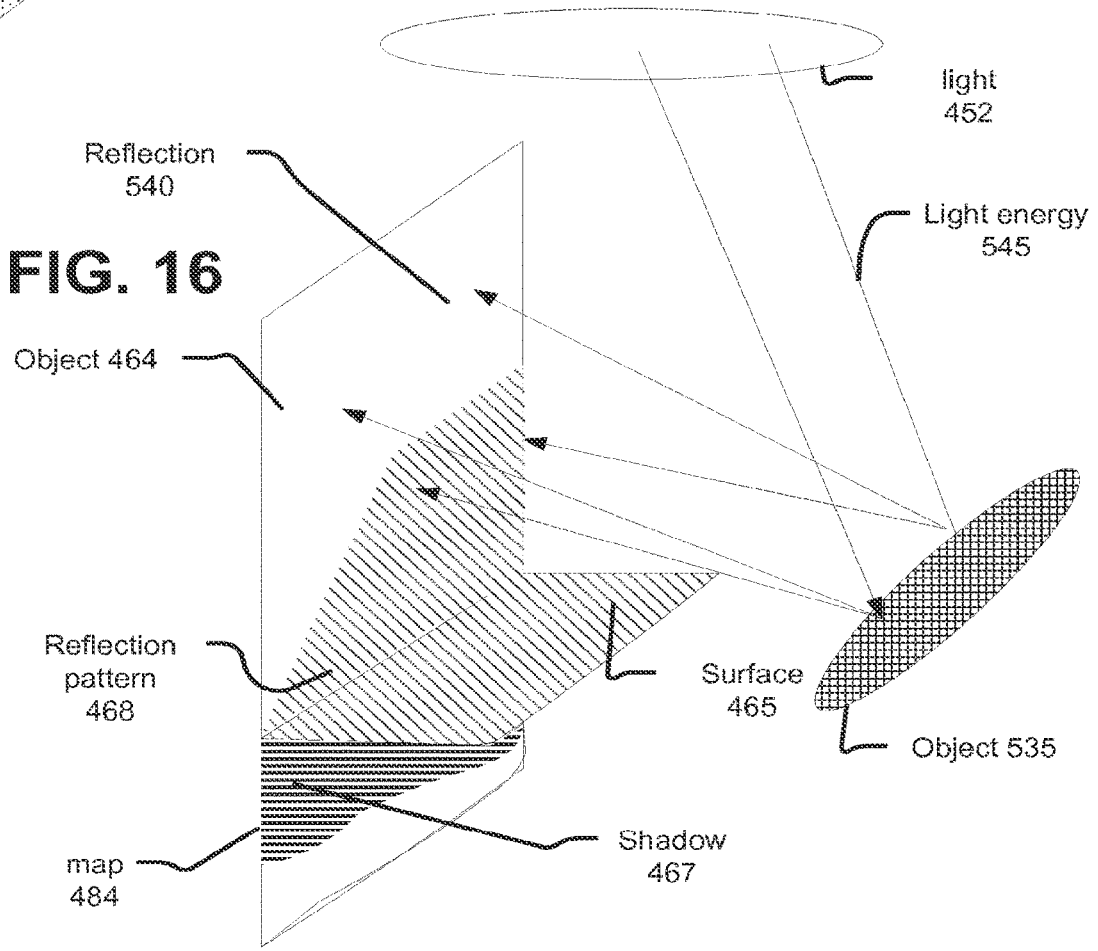
FIG. 16 depicts a toy scene in accordance with FIG. 10, with an introduction of an object that affects global illumination conditions on object 464.

FIG. 15 represented a situation where lightmap data was not potentially invalidated between frames, because sources of light energy and geometry were constant, and so a consideration focused on allocation of sampling opportunities in accordance with a revised viewpoint. FIG. 16 depicts an example in which geometry is dynamic, resulting in potentially dramatic changes to lightmap 484. FIG. 16 shows an additional object 535 that acts as a reflector of light energy 545 onto object 464, causing a reflection 540 on object 464. Other lighting effects including reflection pattern 468, and shadow 467 remain valid.

As with movement of viewpoint 450, an appearance of object 535 may be gradual, instead of immediate. For example, object 535 may gradually come closer to object 464. A variety of approaches may be used to determine how sampling for lightmap 484 may be performed. In one approach, a low-density sampling of elements of lightmap 484 may detect object 535 when it is further away, and when it casts a smaller and/or less intensive reflection on object 464. So, sampling can be made to diffuse from those elements from which sampling first detected object 535 to encompass a larger area of lightmap 484, as object 535 approaches. Existing data in elements selected for sampling may be invalidated, or weighted at a relatively small value to new sample data in such a circumstance, so that an effect of object 535 on lightmap 484 can be accounted for quickly.

FIGS. 17 and 18 depict examples of indicators of influence that can be associated with geometry in or introduced into a 3-D scene. In an example, influence indicators are data associated with geometry that can be used to interpret what effect that geometry may have on light maps associated with other objects in the 3-D scene. When considering fully accurate global illumination, a given element of geometry, in theory, may affect rendering for practically any other object in the 3-D scene. However, in seeking to provide processes and systems that update lightmaps for dynamic geometry fast enough to be useful for realtime rendering, that theory strict condition can be relaxed in one or more ways.

As such, influence indicators can be used to identify a region within which an associated element of geometry can have a significant effect on global illumination of another object. For example, in FIG. 17, an influence indicator 570 is shown as defining curved volumes around the faces of object 535. FIG. 17 shows that the curves can be asymmetrical. A distance from object 535 of influence indicator 570 can be determined based on characteristics of object 535. For example, a shiny object that specularly reflects would have a larger radius than an object that scatters or absorbs incoming light. When an influence indicator 570 comes within a region or intersects an object that is associated with a lightmap, sampling can be started with respect to that object. FIG. 18 depicts another example of an influence indicator that establishes a bounding region around an object. This approach is different than, for example, characterizing a reflectance profile of the surface and using that reflectance profile to determine lighting conditions on the surface. The determining of what to sample and when can be based on aspects of a reflectance profile, for example, weights of coefficients can be used to infer how far reflected or refracted light can travel.

In one approach, coincidence between influence indicators and lightmaps is determined by physics 144, geometry 146, or acceleration structure builder 147 (see FIG. 6). For example, physics 144 may be configured to detect a collision between influence indicator 570 and object 535, and responsively generate an indicator that can be passed through intermediate processing steps, or signaled to sampling control 152. By further example, acceleration structure builder 147 can define a bounding element based on influence indicator 570 and determine whether bounding elements for bounding object 535 share a common parent acceleration structure element, or overlap a volume occupied by the bounding element for the influence indicator 570. Conversely, increased separation, or sufficient separation, of object 535 and influence indicator 570 can be detected, which can trigger reduction of sampling of that object. As such, sampling for a lightmap or a region thereof can be started, stopped, or modified in accordance with aspects of the disclosure. Sampling for some elements of a lightmap can be prioritized over sampling for other elements of the lightmap based on lightmap influence data.

FIG. 19 depicts geometry process 146 outputs geometry to an acceleration structure builder 147, which can maintain a correlation between scene objects, lightmaps and acceleration structure elements. This data can serve as inputs into determining when sampling for a particular lightmap should begin, how much sampling should be allocated to different lightmaps, or both. For example a process by which light map data sampling can be controlled includes that geometry is received for an object and that geometry is located relative to another acceleration structure, which is indicated or flagged as an acceleration structure element that includes a surface to which a light map is mapped. In some situations, the acceleration structure element can be sized and positioned based on considerations relevant for maintaining the lightmap, rather than for ray intersection testing. For example, while it usually is the case that tight bounding is desired for testing rays for intersection, a looser bounding may be desirable in this instance, because a goal is to approximate or detect situations where global illumination conditions are changing. If the object received is located in the acceleration structure element, then lightmap sampling conditions can be adjusted accordingly.

Other implementations may cast a ray or rays with differentials towards a surface, in order to characterize a footprint of the object on the surface. A ray differential can be described by defining a spreading factor associated with a ray, such that the ray and its spreading factor circumstances an area that varies based on distance from an origin of the ray. A spreading factor can be selected based on characteristics of an object from which the ray is cast.

Other aspects include that a mipmap of a lightmap can be created based on a current set of values, and then updated as values within the lightmap are changed. In some implementations of these disclosures, a lightmap is updatable while it also is readable, and as such, it would be desirable to frequently update a mipmap, so that a lookup in the lightmap at a particular level of detail can reference current lightmap data. However, frequently updating an entire mipmap can be wasteful of computation, especially in a circumstance where that lightmap could change shortly after being updated. So, in some situations, sampling for a lightmap is performed in regions, such that sampling for a region of a lightmap can be considered completed, and then a mipmap for that portion of the lightmap can be updated.

Some implementations can provide that sampling for a lightmap for a current frame is completed before that lightmap is used during shading of pixels for that current frame. For example, shading of pixels for a prior frame may be performed while sampling for updating a lightmap for a current frame is conducted. In such implementations, a mipmap can be updated or created based on that lightmap. Also, in such circumstances, there can be a flip chain of lightmaps relating to each frame in flight, where one lightmap is for a frame with pixels currently being shaded and there are one or more lightmaps being updated for future frames.

FIG. 20 depicts an example of a system 500 that can implement aspects of the disclosure. System 500 includes a set of cores 501-503, which can each be capable of executing one or more independent threads of control. Each such core 501-503 can have an instruction decoder, for decoding instructions according to an instruction set architecture. Each core 501-503 can have a private Layer 1 cache. Each core 501-503 can support single instruction multiple data processing, such as a four-wide, eight-wide, sixteen-wide, twenty-four wide or thirty-two wide vector processing unit. The example system 500 includes a Layer 2 cache 515 shared between a subset of cores (e.g., cores 501 and 502). System 500 includes a Layer 3 cache 517 shared among all processor cores 501-503. These elements of system 500 can be included within a module 520 that can itself be tiled.

Module 520 can have an interconnect or internal fabric that connects L3 517 with the cores and with L2. Cache coherency logic can be provided, to implement different cache coherence schemes. L1, L2 and L3 caches can be maintained to be inclusive or exclusive. A RAM 526 may serve all cores 501-503, and may be coherent or incoherent with respect to GPU 532. An interconnect fabric 530 can connect multiple modules 520, a Graphics Processing Unit 532, a storage unit 534 (e.g., mass storage such as magnetic hard drives, or flash memory), one or more network interfaces 538, and an input/output 540 interface, such as PCI-express, an optical interconnect Universal Serial Bus (USB), and so on. System 500 also can have a display 525, which can be coupled with GPU 532. As such, FIG. 20 depicts an example system that is generally in accordance with a conventional computation system, such as a personal computer, a server, a laptop, or even to a tablet or cellphone. Different of these system types can provide different numbers, configurations of the depicted elements, according to target design criteria, such as processing capability, power consumption, display resolution, and so on.

For example, a server can have a vastly higher power consumption envelope than a tablet form factors, as well as a higher price point, which allows more processing capability in module 520, such as more cores, more complicated cores, such as out of order, multiple issue cores, wider SIMD vectors, larger caches, and so on. Some systems may implement many of the functional components shown in within a system on chip. For example, cores 501-503 and GPU 532 may be monolithically fabricated, and may interface to an L3 cache formed on a separate die.

Figure 21:
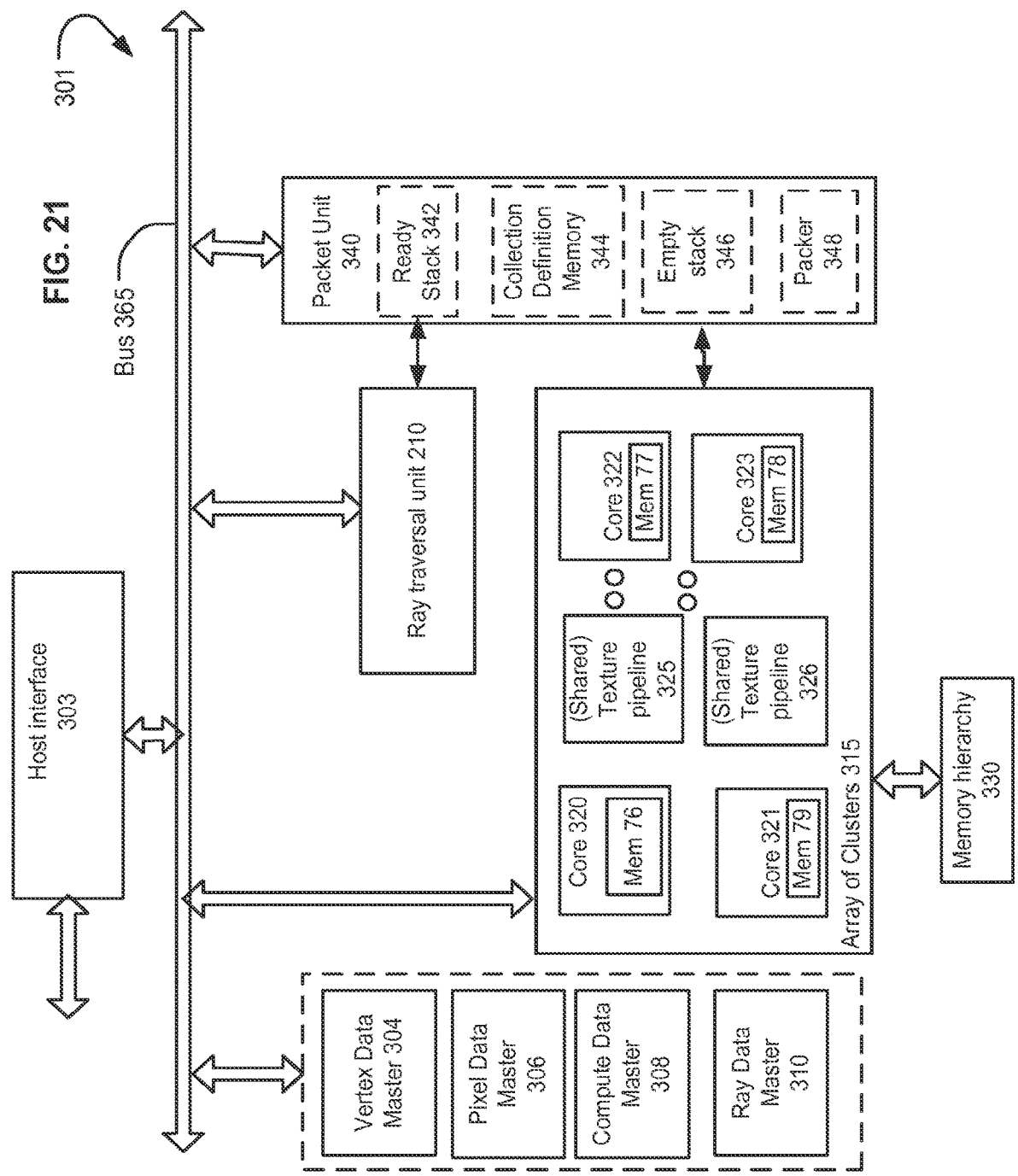
FIG. 21 depicts another example system in which aspects of the disclosure can be practiced.

FIG. 21 depicts an example of a hardware architecture 301 in which aspects of the disclosure can be implemented. FIG. 21 depicts that an array of computation clusters 315 provides a programmable set of computation elements that can be configured to perform computations such as geometry and pixel shading. Array 315 comprises a set of cores 320-323, each with respective local memories 76-79. Shared texture pipelines 325-326 can be used by cores 320-323. A tiling memory may be provided in implementations that support tile based visibility calculations. Such tiling memory may be used for holding display lists produced during a tiling of geometry.

Texture pipelines 325-326 can operate to perform texture sampling, filtering, and other processes specific to texturing. Some applications may use texture pipelines 325-326 for more general filtering and blending or other more general purpose compute applications. A memory hierarchy 330 may comprise various levels of caching and mass data storage for use by array 600. A packet unit 340 may comprise a ready stack 342, a collection definition memory 344, an empty stack 346 and a packer 348. Packet unit 340 may operate to collect specific instances of computation against different scheduling keys and form collections of such instances grouped according to scheduling key. Collections that are ready for further processing can be indicated by data on ready stack 342, while slots that are ready to be filled by new collections may be identified on empty stack 346. Packer 348 receives results of computations performed in array 315 and appends appropriate data to collections determined according to the received results. Elements of provides A set of data masters, including vertex 304, pixel 306, compute 308 and ray 310, determine workloads to be performed on array of clusters 315. A host interface 303 may be provided to connect to another computation unit, not depicted. A bus 365, which can be implemented as a switch fabric or other appropriate data distribution mechanism, sized and arranged according to the throughput and connectivity requirements of a particular implementation may be provided.

The term "subsystem" was used in naming various structural components that may be found in implementations of the disclosure. The term "subsystem" by itself does not imply that structures or circuitry used to implement such a subsystem need to be separate or distinct from structures or circuits that implement other subsystems. In fact, it is expected that programmable elements within a system can be used to implement different subsystems of that system. In general, any subsystem, unit or functional component described herein can be implemented using a programmable computation unit, such as a processor, in conjunction with supporting circuitry that is configured to execute a relevant function or process. Some subsystems, units or functional components may be entirely or partially implemented in limited programmability or fixed function hardware. For example, a scanning component can be implemented using limited configurability circuitry that accepts parameters to setup a triangular primitive for scanning, but does not support scanning of an arbitrary primitive shape. Similarly, a ray tracing subsystem can include a ray intersection testing element that supports a particular kind of intersection test for triangles, and a particular kind of acceleration structure element, in limited programmability circuitry (or two different portions of circuitry). In each of these cases, machine code could be used to configure a processor for implementing these functions, but with an anticipated loss of efficiency.

Also, subsystems themselves may have multiple functional components, and structures used to implement different of these functional components also may implement other functional components. Still further, in some situations, the operation or function of one functional component may also serve to implement another functional component or some portion thereof. For example, a rasterization subsystem can identify visible surfaces for pixels in a frame. Such rasterization subsystem can involve a component that transforms geometry into screen space, a scanning component that determines what pixel is overlapped by each element of geometry and a sorting component that identifies which element of geometry is closest. While such components function, a byproduct can be interpolated parameters for pixels overlapped by the geometry.

For clarity in description, data for a certain type of object, e.g., a primitive (e.g., coordinates for three vertices of a triangle) often is described simply as the object itself, rather than referring to the data for the object. For example, if referring to "a primitive", it is to be understood that such terminology can in effect refer to data representative of that primitive.

Although some subject matter may have been described in language specific to examples of structural features and/or method steps, it is to be understood that the subject matter defined in the appended claims is not necessarily limited to these described features or acts. For example, a given structural feature may be subsumed within another structural element, or such feature may be split among or distributed to distinct components. Similarly, an example portion of a process may be achieved as a by-product or concurrently with performance of another act or process, or may be performed as multiple separate acts in some implementations. As such, implementations according to this disclosure are not limited to those that have a 1:1 correspondence to the examples depicted and/or described.

Above, various examples of computing hardware and/or software programming were explained, as well as examples how such hardware/software can intercommunicate. These examples of hardware or hardware configured with software and such communications interfaces provide means for accomplishing the functions attributed to each of them. For example, a means for performing implementations of each of the processes described herein includes machine executable code used to configure a machine to perform such process implementation. Other means for realizing implementations of the disclosed processes includes using special purpose or limited-programmability hardware to realize portions of the processes, while allocating overall control and management and a decision when to invoke such hardware to software executing on a general purpose computer. Combinations of software and hardware may be provided as a system to interface with software provided by third parties. Such third party software may be written to use a programming semantic specified by the API, which may provide specified built-in functions or provide a library of techniques that may be used during ray tracing based rendering.

Aspects of functions, and methods described and/or claimed may be implemented in a special purpose or general-purpose computer including computer hardware, as discussed in greater detail below. Such hardware, firmware and software can also be embodied on a video card or other external or internal computer system peripherals. Various functionality can be provided in customized FPGAs or ASICs or other configurable processors, while some functionality can be provided in a management or host processor. Such processing functionality may be used in personal computers, desktop computers, laptop computers, message processors, hand-held devices, multi-processor systems, microprocessor-based or programmable consumer electronics, game consoles, network PCs, minicomputers, mainframe computers, mobile telephones, PDAs, tablets and the like.

In addition to hardware embodiments (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL) and so on, or other available programs, databases, and/or circuit (i.e., schematic) capture tools. Embodiments can be disposed in computer usable medium including non-transitory memories such as memories using semiconductor, magnetic disk, optical disk, ferrous, resistive memory, and so on.

As specific examples, it is understood that implementations of disclosed apparatuses and methods may be implemented in a semiconductor intellectual property core, such as a microprocessor core, or a portion thereof, embodied in a Hardware Description Language (HDL)), that can be used to produce a specific integrated circuit implementation. A computer readable medium may embody or store such description language data, and thus constitute an article of manufacture. A non-transitory machine readable medium is an example of computer readable media. Examples of other embodiments include computer readable media storing Register Transfer Language (RTL) description that may be adapted for use in a specific architecture or microarchitecture implementation. Additionally, the apparatus and methods described herein may be embodied as a combination of hardware and software that configures or programs hardware.

Also, in some cases terminology has been used herein because it is considered to more reasonably convey salient points to a person of ordinary skill, but such terminology should not be considered to impliedly limit a range of implementations encompassed by disclosed examples and other aspects. For example, a ray is sometimes referred to as having an origin and direction, and each of these separate items can be viewed, for understanding aspects of the disclosure, as being represented respectively as a point in 3-D space and a direction vector in 3-D space. However, any of a variety of other ways to represent a ray can be provided, while remaining within the present disclosures. For example, a ray direction also can be represented in spherical coordinates. It also would be understood that data provided in one format can be transformed or mapped into another format, while maintaining the significance of the information of the data originally represented. The use of the articles "a" and "an", unless explicitly stated otherwise, include both the singular and plural. Also, the identification of a plurality of elements, such as a plurality of processing cores, or a plurality of rays, does not imply that such plurality includes all such elements that may exist or be processed within.

Also, a number of examples have been illustrated and described in the preceding disclosure, each illustrating different aspects that can be embodied systems, methods, and computer executable instructions stored on computer readable media according to the following claims. By necessity, not every example can illustrate every aspect, and the examples do not illustrate exclusive compositions of such aspects. Instead, aspects illustrated and described with respect to one figure or example can be used or combined with aspects illustrated and described with respect to other figures. As such, a person of ordinary skill would understand from these disclosures that the above disclosure is not limiting as to constituency of embodiments according to the claims, and rather the scope of the claims define the breadth and scope of inventive embodiments herein. The summary and abstract sections may set forth one or more but not all exemplary embodiments and aspects of the invention within the scope of the claims.

What is claimed is:

1. A rendering method for rendering a sequence of frames, the method comprising:
maintaining an indication of lighting conditions on one or more objects across multiple frames of the sequence of frames, wherein the maintaining comprises:
selecting only a portion of the indication of lighting conditions, and
updating existing values of the selected portion of the indication of lighting conditions; and
rendering the frames of the sequence of frames, wherein said rendering comprises sampling the maintained indication of lighting conditions.

2. The method of claim 1, wherein said updating existing values of the selected portion of the indication of lighting conditions comprises updating existing values for the selected portion of the indication of lighting condition in dependence on dynamic conditions.

3. The method of claim 2, wherein said updating existing values of the selected portion of the indication of lighting conditions comprises updating the existing values for the selected elements of the indication of lighting conditions in dependence on changes in one or more of viewpoint, lighting conditions and geometry.

4. The method of claim 1, where the maintaining further comprises tracing rays from locations corresponding to the selected portion of the indication of lighting conditions.

5. The method of claim 4, wherein the updating existing values of the selected portion of the indication of lighting conditions comprises performing a weighted combination of the results of rays traced with existing values for the elements to which the rays pertain.

6. The method of claim 1, wherein said maintaining the indication of lighting conditions is performed concurrently with said rendering the frames.

7. The method of claim 1, wherein said maintaining the indication of lighting conditions is performed asynchronously with said rendering the frames.

8. The method of claim 1, wherein said existing values are values for the samples from a previous frame in the sequence of frames.

9. The method of claim 1, wherein said indication of lighting conditions comprises a texture describing light conditions on one or more objects to which that texture maps.

10. The method of claim 9, wherein said rendering the frames comprises:
determining, for each frame of a sequence of frames, visible surfaces for pixels in the frame, from a respective viewpoint; and
shading the pixels, the shading for at least some of the pixels comprising said sampling the maintained texture, wherein the texture is mappable to a surface visible at one or more of the pixels.

11. The method of claim 10, wherein the determining comprises rasterizing a set of geometry based on the respective viewpoint for the frame, and the maintaining comprises, concurrent with the rasterizing, performing a surface-specific lighting process comprising:
emitting rays from distributed points on a surface of an object in a 3-D scene,
traversing the emitted rays to identify respective intersections between the rays and objects in the 3-D scene,
shading the intersections between the rays and respective objects that were intersected, the shading comprising determining an effect on one or more of the distributed points on the surface of the object and updating a non-transitory memory storing current lighting condition data for the distributed points on the surface of the object;
wherein the rasterizing comprises accessing the current lighting condition data for one or more of the distributed points, in response to determining, during the rasterizing, that those one or more distributed points are visible in a frame of the sequence of frames.

12. The method of claim 9, wherein the maintaining of the texture comprises controlling usage of a processing engine to maintain a pre-determined set of light maps in a non-transitory memory, wherein different light maps of the set are associated with different objects in a 3-D scene, data in the light maps persisting in the non-transitory memory across the multiple frames in the sequence of frames.

13. The method of claim 1, further comprising storing the indication of lighting conditions in memory and providing read access to the indication of lighting conditions in the memory, by said process of rendering the frames of the sequence of frames, while the maintaining is being performed.

14. The method of claim 5, wherein said performing a weighted combination comprises either weighting the results more heavily, relative to the existing data, or invalidating the existing data, in response to a change in geometry in the scene across the frames.

15. The method of claim 1, wherein the selection of the portion of the indication of lighting conditions is made by prioritizing portions of the indication of lighting conditions based on a likelihood that those portions map to locations on a surface that will be visible at one or more pixels in a frame of the sequence of frames.

16. The method of claim 1, wherein the indication of lighting conditions is updatable while it also is readable.

17. The method of claim 9, wherein making the selection of a portion of the indication of lighting conditions comprises setting a sampling density for the texture, based on a level of detail indicator, generated during rasterization applicable to that surface.

18. Apparatus for rendering a sequence of frames, the apparatus comprising:
a maintenance subsystem configured to maintain an indication of lighting conditions on one or more objects across multiple frames of the sequence of frames, wherein the maintenance subsystem is configured to maintain the indication of lighting conditions by:
selecting only a portion of the indication of lighting conditions; and
updating existing values of the selected portion of the indication of lighting conditions; and
rendering logic configured to render the frames of the sequence of frames, wherein said rendering comprises sampling the maintained indication of lighting conditions.

19. The apparatus of claim 18, wherein the rendering logic comprises:
a set of programmable computation units;
a rasterization subsystem configured to receive a stream of geometry elements, for each of the frames in the sequence of frames, and determine a respective visible geometry element for each pixel in each frame in the sequence of frames, wherein the set of programmable computation units is configurable to execute rasterization shading code for the visible geometry elements, the executing rasterization shading code capable of outputting texture sample requests;

a texture sampling subsystem coupled to receive texture sample requests and to return texture data for each texture sample request based on current texture data stored in a memory, wherein a texture stored in the texture memory is mappable to a surface of a geometry element; and a ray tracing subsystem configured to traverse rays through an acceleration structure to identify respective portions of geometry elements to be tested for intersection with the rays, wherein the set of programmable computation units are further configurable to execute ray shading code for intersections determined between rays and geometry elements.

20. A non-transitory computer readable medium having stored thereon computer readable code in a hardware description language that, when processed, enables fabrication of an apparatus for rendering a sequence of frames, the apparatus comprising:

a maintenance subsystem configured to maintain an indication of lighting conditions on one or more objects across multiple frames of the sequence of frames, wherein the maintenance subsystem is configured to maintain the indication of lighting conditions by:
  selecting only a portion of the indication of lighting conditions to be updated; and
  updating existing values of the selected portion of the indication of lighting conditions; and rendering logic configured to render the frames of the sequence of frames, wherein said rendering comprises sampling the maintained indication of lighting conditions.

* * * * *